United States Patent
Bhavaraju et al.

(10) Patent No.: US 12,424,668 B2
(45) Date of Patent: Sep. 23, 2025

(54) MOLTEN METAL BATTERY SYSTEM WITH SELF-PRIMING CELLS

(71) Applicant: Enlighten Innovations Inc., Calgary (CA)

(72) Inventors: Sai V. Bhavaraju, West Jordan, UT (US); Daniel S. Taggart, Broomfield, CO (US); Mykola Makowsky, Calgary (CA); Joshua D. Johnston, Westminster, CO (US); Steven W. Hughes, Calgary (CA)

(73) Assignee: Enlighten Innovations Inc., Calgary (CA)

( * ) Notice: Subject to any disclaimer, the term of this patent is extended or adjusted under 35 U.S.C. 154(b) by 0 days.

(21) Appl. No.: 18/634,049

(22) Filed: Apr. 12, 2024

(65) Prior Publication Data

US 2024/0266613 A1 Aug. 8, 2024

Related U.S. Application Data

(63) Continuation of application No. 18/305,038, filed on Apr. 21, 2023, now Pat. No. 11,961,974.

(60) Provisional application No. 63/333,371, filed on Apr. 21, 2022.

(51) Int. Cl.
*H01M 10/39* (2006.01)
*H01M 4/66* (2006.01)
(Continued)

(52) U.S. Cl.
CPC ......... *H01M 10/399* (2013.01); *H01M 4/661* (2013.01); *H01M 4/74* (2013.01);
(Continued)

(58) Field of Classification Search
CPC ...... H01M 10/399; H01M 4/661; H01M 4/74; H01M 4/76; H01M 50/497; H01M 50/77;
(Continued)

(56) References Cited

U.S. PATENT DOCUMENTS

| 4,371,433 A | 2/1983 | Balko et al. |
| 9,876,253 B2 | 1/2018 | Bhavaraju et al. |

(Continued)

FOREIGN PATENT DOCUMENTS

| EP | 2 671 273 B1 | 12/2013 |
| JP | S58-137974 A | 8/1983 |

(Continued)

OTHER PUBLICATIONS

International Search Report and Written Opinion on PCT/US2023/019413 dated Sep. 6, 2023.

(Continued)

*Primary Examiner* — Helen Oi K Conley
(74) *Attorney, Agent, or Firm* — Foley & Lardner LLP

(57) ABSTRACT

A battery cell capable of self-priming with molten metal produced within the battery cell includes a cathode compartment configured to contain a catholyte that releases metal ions, an anode compartment configured to receive electrons from an external power supply, an ion-selective membrane positioned between the cathode compartment and the anode compartment and configured to selectively transport the metal ions from the cathode compartment to the anode compartment when self-priming the battery cell, and an electrically conductive coating on a surface of the ion-selective membrane facing the anode compartment and configured to distribute the electrons received from the external power supply across the ion-selective membrane when self-priming the battery cell. Self-priming includes combining the electrons with the metal ions arriving at an interface between the electrically conductive coating and the ion-selective membrane to produce the molten metal within the anode compartment.

22 Claims, 22 Drawing Sheets

(51) Int. Cl.
    *H01M 4/74*     (2006.01)
    *H01M 4/76*     (2006.01)
    *H01M 50/497*   (2021.01)
    *H01M 50/77*    (2021.01)

(52) U.S. Cl.
    CPC ........... *H01M 4/76* (2013.01); *H01M 50/497* (2021.01); *H01M 50/77* (2021.01); *H01M 2300/0048* (2013.01)

(58) Field of Classification Search
    CPC .. H01M 2300/0048; H01M 2300/0068; Y02E 60/10
    See application file for complete search history.

(56) References Cited

U.S. PATENT DOCUMENTS

| | | |
|---|---|---|
| 10,020,543 B2 | 7/2018 | Bhavaraju et al. |
| 2018/0323477 A1 | 11/2018 | Zhou et al. |

FOREIGN PATENT DOCUMENTS

| | | |
|---|---|---|
| JP | 2012-521073 A | 9/2012 |
| WO | WO-2012/061823 A1 | 5/2012 |

OTHER PUBLICATIONS

Notice of Reasons for Rejection on JP 2024-561778 dated May 21, 2025.

Section A-A

Section B-B

MOLTEN METAL BATTERY SYSTEM WITH SELF-PRIMING CELLS

CROSS-REFERENCE TO RELATED PATENT APPLICATIONS

This application is a continuation of U.S. patent application Ser. No. 18/305,038 filed Apr. 21, 2023, which claims the benefit of and priority to U.S. Provisional Patent Application No. 63/333,371 filed Apr. 21, 2022, both of which are incorporated herein by reference in their entireties.

BACKGROUND

The present disclosure relates generally to electro-chemical batteries and more particularly to electro-chemical battery systems that use molten sodium or other molten metal. Batteries are known devices that are used to store and release electrical energy for a variety of purposes. In order to produce electrical energy, batteries typically convert chemical energy directly into electrical energy. Generally, a single battery includes one or more galvanic cells, wherein each of the cells is made of two half-cells that are electrically isolated except through an external circuit. During discharge, electrochemical reduction occurs at the cell's positive electrode, while electrochemical oxidation occurs at the cell's negative electrode. While the positive electrode and the negative electrode in the cell do not physically touch each other, they are generally chemically connected by one or more ionically conductive and electrically insulative electrolytes, which can either be in a solid or a liquid state, or in combination. When an external circuit, or a load, is connected to a terminal that is connected to the negative electrode and to a terminal that is connected to the positive electrode, the battery drives electrons through the external circuit, while ions migrate through the electrolyte.

Batteries can be classified in a variety of manners. For example, batteries that are completely discharged only once are often referred to as primary batteries or primary cells. In contrast, batteries that can be discharged and recharged more than once are often referred to as secondary batteries or secondary cells. A flow battery or redox flow battery is a type of secondary cell where chemical energy is provided by two chemical components dissolved in liquids (i.e., an anolyte and a catholyte) that are pumped through the system on separate sides of an ion-selective membrane. Ion transfer occurs through the membrane while the anolyte and the catholyte circulate in their own respective spaces on opposite sides of the membrane. The ion transfer is accompanied by a flow of electric current into or out of electrodes (i.e., an anode and a cathode) located at least partially within the anolyte and catholyte respectively. The anolyte and the catholyte are typically ionically conductive and electrically insulative electrolytes that facilitate ion exchange but do not conduct significant electric current. As such, the fluid circuits through which the anolyte and the catholyte flow can pass through multiple battery cells without causing electric current to flow between the battery cells via the anolyte or the catholyte fluids.

A molten sodium battery is a specialized type of secondary cell that replaces both the anode and the anolyte of a conventional secondary cell with molten sodium metal (elemental symbol $Na^+$). One example of a molten sodium battery is described in detail in U.S. Pat. No. 10,020,543 granted Jul. 10, 2018, the entire disclosure of which is incorporated by reference herein. When discharging a molten sodium battery, positively charged sodium ions or cations ($Na^+$) are separated from electrons ($e^-$) within the sodium metal on the anode side of the membrane. The $Na^+$ ions pass through the ion-selective membrane and react with the catholyte on the opposite side of the membrane while the electrons are driven through an external circuit. The opposite reaction occurs when charging the molten sodium battery. The $Na^+$ ions pass through the ion-selective membrane from the catholyte and join with electrons on the anode side of the membrane to form sodium metal.

Sodium metal batteries may include molten sodium anodes coupled with energy dense cathodes such as sulfur, nickel chloride, halogens, or intercalation cathodes. Typically a ceramic sodium ion-conducting membrane such as sodium beta-alumina or NaSICON, is used to separate the molten sodium anode from the cathode. These batteries may be self-contained where the molten sodium anode and the cathode/catholyte are hermetically sealed in respective compartments or may be configured as a hybrid flow battery where the sodium can is transferred between the anode chamber and an external container while the catholyte can actively circulate between the cathode chamber and an external source.

In previous sodium metal battery systems, the sodium metal and the cathode/catholyte must be preloaded into the battery cells. For example, the anode compartments of the battery cells must be pre-filled with the sodium metal (i.e., primed) prior to operation. Priming is typically required because the anode compartment of the battery cell is initially empty such that the negative terminal of the battery cell (i.e., the anode current collector) is separated from the ion-selective membrane by an air gap or other non-conductive fluid prior to operation. This electrical break prevents electrons from traveling from the negative terminal to the surface of ion-selective membrane where the electrons can join with metal cations transported through the ion-selective membrane from the cathode compartment to form the sodium metal within the anode compartment. Priming the anode compartment with the sodium metal prior to operation provides the required electrical connection between the negative terminal and the ion-selective membrane because the sodium metal is an electrical conductor. However, priming the anode compartment typically requires an initial supply of the sodium metal to be added to the battery cell from an external source. Elaborate steps must be taken in handling and loading molten sodium metal into the anode compartment, increasing the complexity and cost of the battery system.

In self-contained or sealed sodium metal batteries, the anode compartments are typically preloaded with sodium metal during manufacturing (i.e., before the anode compartments are sealed). This is required because, unless the anode compartments are filled and a good sodium-membrane interface is established, the battery cells may be damaged during initial operation when localized high current densities are developed on the cathode and the membrane. Hence, self-contained sodium metal batteries are often conditioned using low current conditions at the manufacturing facility to establish a good sodium-membrane interface. This requires establishing a closed circuit before operation. Additionally, preloading sodium into self-contained sodium metal batteries means that the battery cells are built in a charged state. This requires the cathode to also be built in the charged state. Normally, this requires handling more energetic chemicals such as sulfur, halogens, etc. Charged cells are also prone to self-discharge and accidental shorting. While it would be desirable to construct the battery cells in the discharged state, the requirement to preload sodium into the anode compartments prevents discharged construction for the reasons noted above.

SUMMARY

The present disclosure provides a novel solution to the challenges associated with conventional molten sodium batteries and battery systems. Rather than preloading or priming the battery cells with molten sodium from an external source during manufacturing or prior to operation, the molten sodium is generated in situ within the anode compartments by drawing sodium ions from the catholyte. This avoids the requirement to condition the battery cells using low current conditions to prevent hotspots and does not require the circuit between the negative terminal of the battery cell and the ion-selective membrane to be closed prior to commissioning. The present disclosure describes such a battery cell construction and methods of operation to produce sodium in situ, referred to herein as self-priming.

One implementation of the present disclosure is a battery cell capable of self-priming with molten metal produced within the battery cell. The battery cell includes a cathode compartment configured to contain a catholyte that releases metal ions when self-priming the battery cell, an anode compartment at least partially containing an anode current collector that receives electrons from an external power supply when self-priming the battery cell, an ion-selective membrane positioned between the cathode compartment and the anode compartment and configured to selectively transport the metal ions from the cathode compartment to the anode compartment when self-priming the battery cell, and an electron transport structure extending between the anode current collector and the ion-selective membrane within the anode compartment and configured to transport the electrons from the anode current collector to the ion-selective membrane when self-priming the battery cell. Self-priming the battery cell includes combining the electrons with the metal ions arriving at an interface between the electron transport structure and the ion-selective membrane to produce the molten metal within the anode compartment.

In some embodiments, the anode compartment is empty of the molten metal prior to self-priming the battery cell and the molten metal produced within the anode compartment at least partially fills the anode compartment with the molten metal when self-priming the battery cell without requiring an additional supply of the molten metal from an external source.

In some embodiments, the battery cell includes an electrically conductive coating on a surface of the ion-selective membrane facing the anode compartment and configured to distribute the electrons received from the electron transport structure across the surface of the ion-selective membrane. In some embodiments, the electrically conductive coating includes at least one of a metal, a metal oxide, a metal sulfide, or carbon. In some embodiments, the electrically conductive coating includes at least one of an indium tin oxide, manganese oxide, titanium oxide, nickel oxide, tungsten sulfide, nickel sulfide, titanium sulfide, zirconium sulfide, vanadium sulfide, iron sulfide, molybdenum sulfide, cobalt sulfide, or copper sulfide. In some embodiments, the electrically conductive coating includes a second metal including at least one of tin, lead, mercury, indium, and/or any metal capable of alloying with the molten metal. In some embodiments, the electrically conductive coating forms an electrically conductive layer between the molten metal and the ion-selective membrane during initial production of the molten metal within the anode compartment and dissolves in the molten metal produced within the anode compartment causing the molten metal to directly contact the surface of the ion-selective membrane after the electrically conductive coating dissolves. In some embodiments, the electrically conductive coating has a thickness substantially between 10 nanometers and 10 microns. In some embodiments, the electrically conductive coating has an electrical conductivity substantially between 100 Siemens/cm and $10^6$ (i.e., 1,000,000) Siemens/cm. In some embodiments, the electrically conductive coating has an electrical conductivity substantially between 10 Siemens/cm and $10^6$ Siemens/cm or subranges thereof (e.g., between 10 Siemens/cm and $10^5$ Siemens/cm, between 100 Siemens/cm and $10^5$ Siemens/cm, between 100 Siemens/cm and $10^6$ Siemens/cm, etc.).

In some embodiments, the electron transport structure contacts the electrically conductive coating at a single location and the electrically conductive coating receives the electrons at the single location and distributes the electrons across the surface of the ion-selective membrane. In some embodiments, the electron transport structure includes an electrically conductive mesh contacting the surface of the ion-selective membrane at a plurality of points and configured to distribute the electrons received from the anode current collector across the surface of the ion-selective membrane. In some embodiments, the electron transport structure is substantially rigid and provides structural support to the ion-selective membrane by applying a force to the surface of the ion-selective membrane. In some embodiments, the electron transport structure includes one or more wires extending between the anode current collector and the ion-selective membrane.

In some embodiments, the electron transport structure is configured to provide a first electrical connection between the anode current collector and the ion-selective membrane prior to self-priming the battery cell and melt or dissolve in the molten metal produced within the anode compartment. In some embodiments, the molten metal produced within the anode compartment provides a second electrical connection between the anode current collector and the ion-selective membrane after the electron transport structure melts or dissolves.

In some embodiments, the electron transport structure and the anode current collector are integral parts of a unitary anode scaffold structure comprising a three-dimensional lattice of electrically conductive material. In some embodiments, the electron transport structure is located along an outer boundary of the anode compartment such that the electron transport structure forms at least a portion of the outer boundary and contains the molten metal within the anode compartment after the molten metal is produced within the anode compartment. In some embodiments, the electron transport structure is constructed separately from the anode current collector and the ion-selective membrane and inserted into the anode compartment after initial construction.

In some embodiments, the anode current collector includes metal plate comprising at least one of steel, nickel, or carbon.

In some embodiments, the battery cell includes a port along a surface of the anode compartment. In some embodiments, the molten metal produced within the anode compartment flows passively between the anode compartment and an external storage container via the port without requiring a powered component to cause the molten metal to flow.

Another implementation of the present disclosure is a method for self-priming a battery cell with molten metal produced within the battery cell. The method includes releasing metal ions from a catholyte contained within a cathode compartment of the battery cell, receiving electrons from an external power supply at an anode current collector contained at least partially within an anode compartment of the battery cell, transporting the metal ions from the cathode compartment to the anode compartment via an ion-selective membrane positioned between the cathode compartment and the anode compartment, transporting the electrons from the anode current collector to the ion-selective membrane via an electron transport structure extending between the anode current collector and the ion-selective membrane within the anode compartment, and self-priming the battery cell by combining the metal ions with the electrons within the anode compartment to produce the molten metal within the anode compartment.

In some embodiments, the anode compartment is empty of the molten metal prior to self-priming the battery cell and self-priming the battery cell comprises at least partially filling the anode compartment with the molten metal produced within the anode compartment without requiring an additional supply of the molten metal from an external source.

In some embodiments, a first portion of the metal ions released from the catholyte form a first portion of the molten metal that at least partially fills the anode compartment when self-priming the battery cell. In some embodiments, a second portion of the metal ions released from the catholyte form a second portion of the molten metal that flows out of the anode compartment and into an external storage container after self-priming the battery cell.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Overview

Referring generally to the FIGURES, a molten sodium battery system with self-priming battery cells and components thereof are shown, according to various exemplary embodiments. Although the battery system is described and shown primarily as a molten sodium battery system throughout the present disclosure, it is contemplated that a variety of other molten alkali metals, other types of molten metals (i.e., non-alkali metals), molten metal alloys or eutectics, pure molten metals (i.e., not a mixture of multiple different metals), and/or other electrically conductive fluids, substances, or materials could be used in place of molten sodium metal without departing from the teachings provided herein. The specific types of chemicals, substances, and materials provided herein are examples that would be suitable for practicing the systems and methods of the present disclosure, but should not be regarded as limiting. The following description refers to the battery system primarily as a molten sodium battery system or molten metal battery system for ease of explanation.

The molten sodium battery system may include one or more secondary cells (i.e., rechargeable battery cells), each of which includes a molten sodium metal anode, an ion-selective membrane (the term "membrane" used herein to refer to any suitable type of separator), and a cathode compartment through which a catholyte circulates (e.g., via an external pump). The ion-selective membrane is positioned between the molten sodium metal anode and the catholyte compartment and permits positively charged sodium cations ($Na^+$) to pass through when charging or discharging the secondary cell.

Figure 30:
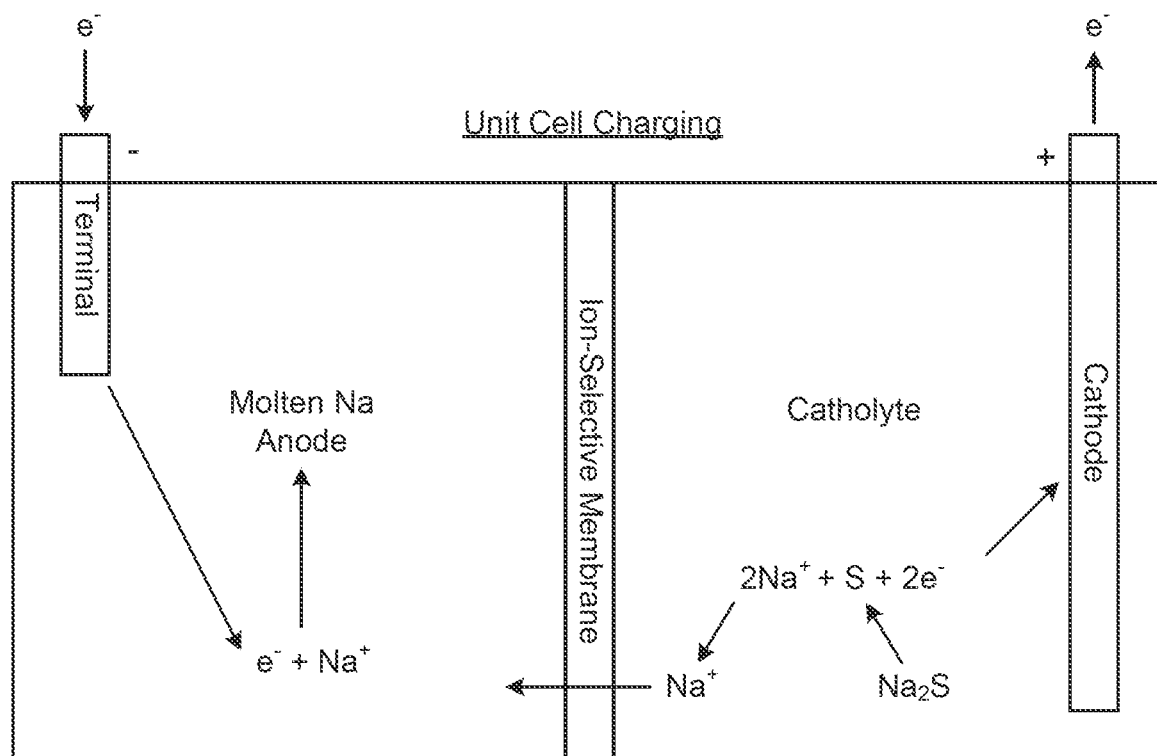
FIG. 30 is a diagram illustrating electro-chemical reactions which may occur when charging unit cells of the system of FIG. 11 and/or the self-priming battery cell of FIG. 1, according to some embodiments.
Figure 31:
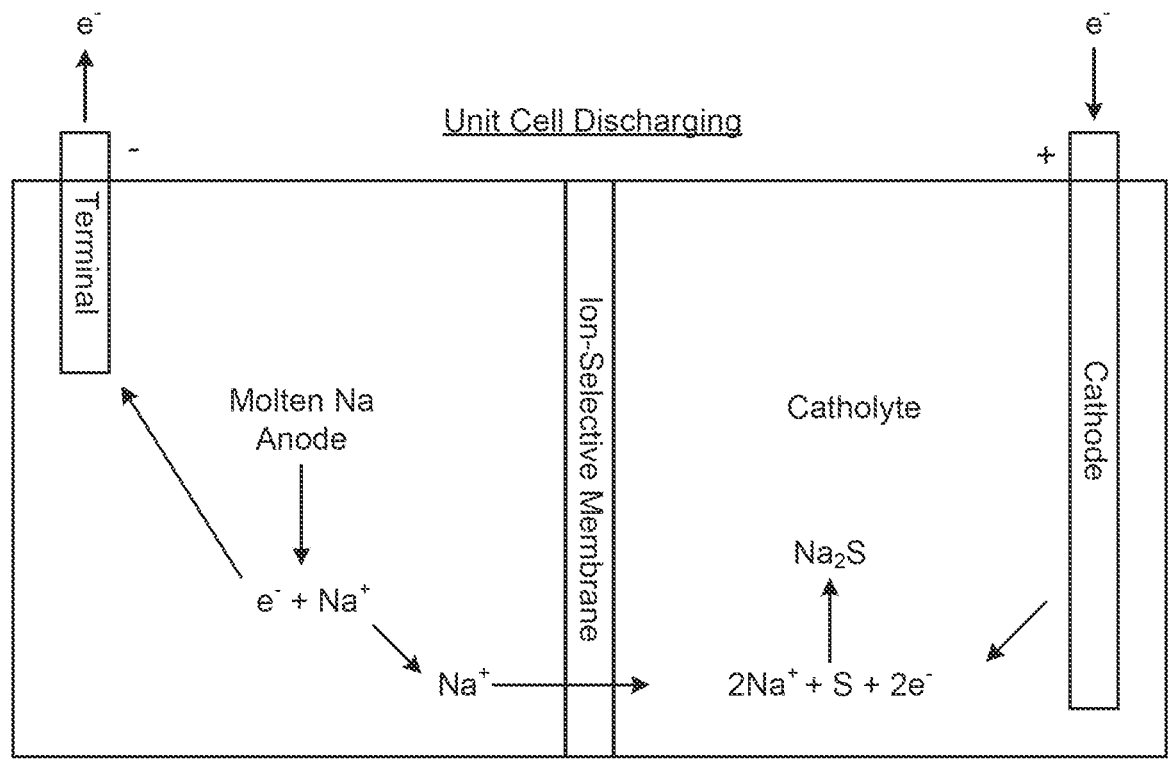
FIG. 31 is a diagram illustrating electro-chemical reactions which may occur when discharging unit cells of the system of FIG. 11 and/or the self-priming battery cell of FIG. 1, according to some embodiments.

The molten sodium battery system can operate in multiple modes including a flow battery mode and a sodium production mode. In flow battery mode, the molten sodium battery system can operate to charge the battery or discharge the battery. When charging the battery, electricity is consumed and $Na^+$ ions pass through the ion-selective membrane from the catholyte and join with electrons ($e^-$) on the anode side of the membrane (i.e., within the molten sodium anode) to form sodium metal (Na). The charging process is illustrated in FIG. 30. In some embodiments, the catholyte (e.g., $Na_2S$) may separate into sodium cations (e.g., $2Na^+$), electrons ($2e^-$), and one or more other elements or compounds (e.g., S). In some embodiments, the reaction goes through various polysulfides (e.g., $Na_2S_8$, $Na_2S_7$, $Na_2S_6$, $Na_2S_5$, $Na_2S_4$, $Na_2S_3$, $Na_2S_2$, $Na_2S$). When discharging the battery, the opposite reaction occurs. Sodium metal flows into the molten sodium anodes of the unit cells from the string-specific sodium reservoirs and is consumed within the unit cells to produce sodium ions $Na^+$ and electrons. The $Na^+$ ions pass through the ion-selective membrane and react with the catholyte, while the electrons are discharged from the battery in the form of electricity. The discharging process is illustrated in FIG. 31. In sodium production mode, the molten sodium battery system operates in a manner similar to when the battery is charging in flow battery mode. Electricity is consumed and $Na^+$ ions pass through the ion-selective membrane from the catholyte and join with electrons ($e^-$) on the anode side of the membrane (i.e., within the molten sodium anode) to form sodium metal (Na) as described above.

In previous molten metal battery systems that use molten metal as the anodes of the battery cells, the anode compartments of the battery cells must be pre-filled with the molten metal (i.e., primed) prior to operation. Priming is typically required because the anode compartment of the battery cell is initially empty such that the negative terminal of the battery cell (i.e., the anode current collector) is separated from the ion-selective membrane by an air gap or other non-conductive fluid prior to operation. This electrical break prevents electrons from traveling from the negative terminal to the surface of ion-selective membrane where the electrons can join with metal cations transported through the ion-selective membrane from the cathode compartment to form the molten metal within the anode compartment. Priming the anode compartment with the molten metal prior to operation provides the required electrical connection between the negative terminal and the ion-selective membrane because the molten metal is an electrical conductor. However, priming the anode compartment typically requires an initial supply of the molten metal to be added to the battery cell from an external source.

Advantageously, the self-priming battery cell described herein may be capable of priming itself with molten metal (e.g., molten sodium) without requiring an external supply of the molten metal (e.g., from an external sodium source). The self-priming battery cell may be capable of generating an initial amount of the molten metal used to prime the anode compartment in situ (i.e., within the anode compartment) and therefore does not require the anode compartment to be preloaded with the molten metal from an external source prior to operation. The key feature that enables self-priming is an electron transport structure that provides an electrical connection between the negative terminal and the ion-selective membrane before the anode compartment is filled with the molten metal. The electron transport structure allows electrons from the negative terminal to reach the surface of the ion-selective membrane so that the metal cations arriving from the cathode compartment can get immediately reduced to the molten metal as they exit the ion-selective membrane. In some embodiments, the surface of the ion-selective membrane facing the anode compartment can be covered with an electrically conductive coating (e.g., tin or other materials, described in greater detail below) that functions to distribute the electrons arriving via the electron transport structure across the surface of the ion-selective membrane. With this unique cell construction, there is no need to pre-fill the anode compartment with the molten metal to provide the required electrical connection prior to operation.

As the molten metal starts forming within the anode compartment, additional electrical connections (i.e., via the molten metal) are created between the negative terminal and the ion-selective membrane. This allows the electron transport structure to be removed and/or allows for electron transport structures that are transient or self-dissipating. For example, the electron transport structure can be made of a material that dissolves, melts, or alloys with the molten metal within the anode compartment. The electrically conductive coating can be similarly transient or self-dissipating because the molten metal will distribute the electrons across the surface of the ion-selective membrane once the anode compartment is filled with the molten metal. The electron transport structure can take any of a variety of forms including one or more wires that contacts the ion-selective membrane at one or more points, an electrically conductive mesh (e.g., a lattice structure, scaffold, framework, etc.) that provides structural support to the anode compartment in addition to an electrical flow path, one or more rigid panels that form a boundary of the anode compartment, or any of a variety of other forms. These and other features of the self-priming battery cell are described in greater detail below.

Self-Priming Battery Cell

Referring now to FIGS. 1-10, a self-priming battery cell 100 is shown, according to various exemplary embodiments. The self-priming battery cell 100 can be used in any type of molten metal battery system (e.g., a molten sodium battery system) or any other type of battery system that uses molten metal or any other type or combination of electrically conductive material as the anode and/or cathode. One example of a molten metal battery system 1100 that can use the self-priming battery cell 100 is described in greater detail below with reference to FIGS. 11-31. The self-priming battery cell 100 may be an embodiment of the battery cells 1700 in system 1100 (described in greater detail below) and may be capable of performing some or all of the functions of the battery cells 1700 described with reference thereto. The self-priming battery cell 100 may include some or all of the components of the battery cells 1700 and can be operated in sodium production mode, flow battery charging mode, flow battery discharging mode, or any other mode described in detail with reference to FIGS. 11-31. It is contemplated that any of the components or functions of the self-priming battery cell 100 can be added to or included in the battery cells 1700 and can be combined with any of the components or functions described with reference thereto without departing from the teachings of the present disclosure.

Self-Priming Battery Cell Construction

Figure 1:
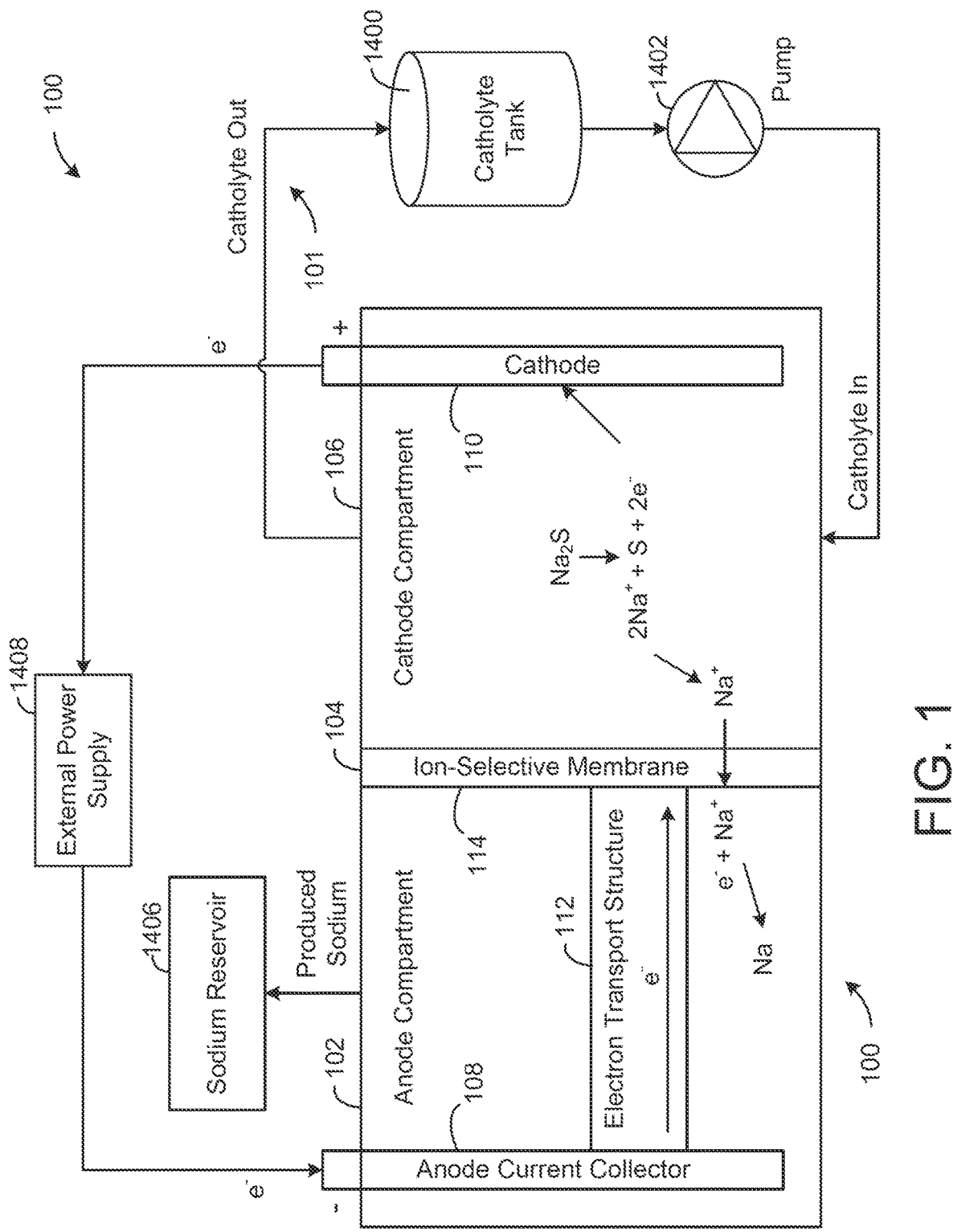
FIG. 1 is a diagram of a self-priming battery cell (a "unit cell") including an electron transport structure within an anode compartment of the unit cell, according to some embodiments.

Referring to FIG. 1, the self-priming battery cell 100 is shown to include an anode compartment 102, an ion-selective membrane 104, a cathode compartment 106, an anode current collector 108, and a cathode 110. Many of the components of the self-priming battery cell 100 may be the same as or similar to the corresponding components of the battery cells 1700. For example, the cathode compartment 106 may be the same as or similar to the catholyte chambers 1704 of the battery cells 1700. The cathode compartment 106 may be configured to contain a catholyte that releases metal ions (e.g., sodium cations $Na^+$) when charging the self-priming battery cell 100 (e.g., when operating in sodium production mode, flow battery charging mode, and/or self-priming). As shown in FIG. 1, the catholyte (e.g., $Na_2S$) may separate into sodium cations (e.g., $2Na^+$), electrons ($2e^-$), and one or more other elements or compounds (e.g., S). In some embodiments, the reaction goes through various polysulfides (e.g., $Na_2S_8$, $Na_2S_7$, $Na_2S_6$, $Na_2S_8$, $Na_2S_4$, $Na_2S_3$, $Na_2S_2$, $Na_2S$). The catholyte may include any suitable type of positive electrolyte or positive electrode solution. In some embodiments, the catholyte can be or include any type of fluid capable of exchanging metal ions (e.g., sodium ions or other metal cations) with the molten metal contained in the anode compartment 102. Examples of suitable catholytes include but are not limited to sodium sulfides, sodium halides, aluminum sulfides, aluminum halides, and/or any of the positive electrolytes or positive electrode solutions described in U.S. Pat. No. 10,734,686 granted Aug. 4, 2020, U.S. Pat. No. 8,968,902 granted Mar. 3, 2015, U.S. Patent Application Publication No. 2021/0280898 published Sep. 9, 2021, and/or U.S. Patent Application Publication No. 2021/0277529 published Sep. 9, 2021. The entire disclosure of each of these patents and patent application publications is incorporated by reference herein.

The catholyte may flow through a catholyte circuit 101 that connects the cathode compartment 106 with an external cathode tank 1400 and a pump 1402 located outside the self-priming battery cell 100. The pump 1402 can be controlled to cause the catholyte to flow through the catholyte circuit 101 between the cathode compartment 106 and the catholyte tank 1400 where a surplus volume of the catholyte is stored. The catholyte within the cathode compartment 106 may fluidly contact the cathode 110 (i.e., a positive electrode or positive terminal) located at least partially within the cathode compartments 106. The cathode 110 may be the same as or similar to the cathodes 1702 of the battery cells 1700. For example, the cathode 110 may be made of or include any suitable cathode material including, for example, nickel, nickel oxyhydroxide (NiOOH), nickel hydroxide ($Ni(OH)_2$), sulfur composites, sulfur halides, including sulfuric chloride or lithium thionyl chloride, any of the positive electrode materials described in any of the patents or patent application publications cited in the present disclosure, and/or any other suitable positive electrode material.

The ion-selective membrane 104 may be the same as or similar to the ion-selective membranes 1706 of the battery cells 1700. The ion-selective membrane 104 may be configured to selectively transport the metal ions from the cathode compartment 106 to the anode compartment 102 when charging the self-priming battery cell 100. In some embodiments, the ion selective membrane 104 is selective of sodium ions ($Na^+$) and may include ceramic, NaSICON, and/or beta-alumina materials capable of selectively transporting sodium ions. However, the ion-selective membrane 104 may be selective of other types of ions (i.e., other than sodium) if other anode materials are used instead of sodium metal. For example, it is contemplated that a variety of other molten alkali metals, other types of molten metals (i.e., non-alkali metals), molten metal alloys or eutectics, pure molten metals (i.e., not a mixture of multiple different metals), and/or other electrically conductive fluids, substances, or materials could be used in place of molten sodium metal without departing from the teachings provided herein. For ease of explanation, the present disclosure refers to the anode material primary as molten metal.

The anode compartment 102 may be the same as or similar the anode chambers 1708 of the battery cells 1700. The anode compartment 102 may be configured to contain molten metal (e.g., molten sodium metal) produced within the anode compartment 102 during operating, or any other material used as the anode in the self-priming battery cell 100. Prior to operation, the anode compartment 102 may initially be empty of the molten metal and may be filled with the molten metal as the molten metal is produced within the anode compartment 102 during the self-priming operation. Excess molten metal produced within the anode compartment (e.g., when operating in sodium production mode or flow battery charging mode) may be stored in the sodium reservoir 1406, which may be fluidly connected to the anode compartment 102 via a sodium conduit. In some embodiments, the molten metal produced within the anode compartment 102 flows to the sodium reservoir 1406 as a result of physical displacement of the molten metal within the anode compartment as new molten metal is produced. Accordingly, a powered component such as a pump may not be required to cause the molten metal to flow between the anode compartment 102 and the sodium reservoir 1406. In some embodiments, the sodium reservoir 1406 is located above the anode compartment 102 (e.g., directly above or otherwise at a greater elevation) such that gravity causes the molten metal within the sodium reservoir 1406 to flow back into the anode compartment 102 when space exists within the anode compartment (e.g., as the molten metal is consumed within the anode compartment 102 during flow battery discharging mode).

The anode current collector 108 may be a negative electrode or terminal and may be located at least partially within the anode compartment 102. The anode current collector 108 and the cathode 110 form the negative and positive terminals respectively of the self-priming battery cell 100. The anode current collector 108 and the cathode 110 may be electrically connected to an external power supply 1408 that provides electrons to the anode current collector 108 when charging the self-priming battery cell 100 (e.g., during self-priming or when operating in flow battery charging mode or sodium production mode). As illustrated in FIG. 1, the electrons (e⁻) received from the external power supply 1408 may flow into the self-priming battery cell 100 via the anode current collector 108 and may be transported from the anode current collector 108 to the surface of the ion-selective membrane 104 facing the anode compartment 102 by the electron transport structure 112. The electrons (e⁻) from the electron transport structure 112 may join with the molten metal ions (Na⁺) transported through the ion-selective membrane 104 at the surface of the ion-selective membrane 104 and may join with the molten metal ions to reduce the molten metal ions and produce the molten metal (Na) in non-ionized form.

The electron transport structure 112 can have a variety of different forms, shapes, sizes, or other structural designs. The block depiction of the electron transport structure 112 in FIG. 1 is provided to illustrate the primary function of the electron transport structure 112 (i.e., to transport electrons from the anode current collector 108 to the ion-selective membrane 104 during the self-priming operation) and is not representative of the wide range of different shapes, structures, designs, or other configurations of the electron transport structure 112 that could be used in the self-priming battery cell 100. For example, in some embodiments, the electron transport structure 112 includes one or more wires extending between the anode current collector 108 and the ion-selective membrane 104. In some embodiments, the electron transport structure 112 includes an electrically conductive mesh that contacts the surface of the ion-selective membrane 104 at a plurality of points and distributes the electrons received from the anode current collector 108 across the surface of the ion-selective membrane 104. In some embodiments, the electron transport structure 112 is substantially rigid and provides structural support to the ion-selective membrane 104 by applying a force to the surface of the ion-selective membrane 104.

In some embodiments, the electron transport structure 112 is formed (e.g., manufactured, created, constructed, etc.) separately from other components of the self-priming battery cell 100 and inserted into the anode compartment 102 after formation (e.g., after initial manufacturing or construction). For example, the electron transport structure 112 may be a discrete component that can be retrofit to existing battery cells to imbue the battery cells with self-priming functionality. The electron transport structure 112 can be placed in the anode compartment 102 between the anode current collector 108 and the ion-selective membrane 104 such that the sides or ends of the electron transport structure 112 make physical or electrical contact with both the anode current collector 108 and the ion-selective membrane 104. In some embodiments, the electron transport structure 112 is removable (e.g., not permanently attached or connected to the anode current collector 108 and the ion-selective membrane 104) and can be removed from the anode compartment 102 after completion of the self-priming operation.

Alternatively, the electron transport structure 112 can be welded or otherwise fixed to the anode current collector 108 and/or the ion-selective membrane 104 to provide a more permanent connection.

In some embodiments, the electron transport structure 112 can be integrated with one or more other components of the self-priming battery cell 100. For example, the electron transport structure 112 may be physically or structurally combined with the anode current collector 108 and/or the ion-selective membrane 104 such that they form a single integral component or unitary part. In some embodiments, the electron transport structure 112 and the anode current collector 108 are parts of a unitary anode scaffold structure that includes a three-dimensional lattice of electrically conductive material extending across the anode compartment 102. In some embodiments, the electron transport structure 112 forms a surface of the anode compartment 102 (e.g., a top wall, side wall, bottom wall, etc.) which contains the molten metal within the anode compartment 102 after the molten metal is produced and defines the shape of the anode compartment 102 and/or self-priming battery cell 100 as a whole.

In some embodiments, the electron transport structure 112 is transient or self-dissipating. For example, the electron transport structure 112 may be made of a material that dissolves, melts, alloys, or reacts with the molten metal produced within the anode compartment 102. Accordingly, the electron transport structure 112 may initially be present within the anode compartment 102 prior to production of molten metal within the anode compartment 102 (i.e., when the anode compartment 102 is empty of the molten metal prior to the self-priming operation), but may begin to dissipate (e.g., dissolve, alloy, react, etc.) as the molten metal is produced within the anode compartment 102. In some embodiments, the electron transport structure 112 provides a first electrical connection between the anode current collector 108 and the ion-selective membrane 104 prior to starting the self-priming operation. As the molten metal is produced within the anode compartment 102, the electron transport structure may begin to dissipate and may be replaced by the molten metal. The molten metal produced within the anode compartment 102 may provide a second electrical connection between the anode current collector 108 and the ion-selective membrane 104 after the electron transport structure dissipates to maintain the electrical conductivity between the anode current collector 108 and the ion-selective membrane 104.

In some embodiments, the electron transport structure 112 may be persistent (e.g., long lasting, permanent, etc.) such that the electron transport structure 112 remains within the anode compartment 102 throughout the life of the self-priming battery cell 100. For example, the electron transport structure 112 may be made of a material that does not dissolve or react with the molten metal (e.g., a stainless steel coating or mesh that is stable with sodium metal) or does not melt at the temperature of the molten metal within the anode compartment 102.

Accordingly, the electron transport structure 112 may remain within the anode compartment in substantially its original form even after the anode compartment 102 is filled with the molten metal in some embodiments. Several examples of different structures that could be used as the electron transport structure 112 are described in greater detail with reference to FIGS. 2-10.

In some embodiments, the surface of the ion-selective membrane 104 facing the anode compartment 102 is coated with an electrically conductive coating 114. The electrically conductive coating 114 may function to distribute the electrons received from the electron transport structure 112 across the surface of the ion-selective membrane 104. Distributing the electrons across the surface of the ion-selective membrane 104 may allow the electrons to join with the molten metal ions that appear at any location along the surface of the ion-selective membrane 104 to promote efficient and rapid production of the molten metal during the self-priming operation. Distributing the electrons across the surface of the ion-selective membrane 104 may also reduce electrical hotspots and avoid high electrical current densities that could develop at select locations along the surface of the ion-selective membrane 104.

The electrically conductive coating 114 provides a greater benefit to the self-priming battery cell 100 when the electron transport structure 112 contacts the ion-selective membrane 104 at a low number of points (e.g., a single point contact, a few point contacts, etc.) or has a low area of contact with the ion-selective membrane 104. For example, the electron transport structure 112 may contact the electrically conductive coating 114 at a single point. The electrically conductive coating 114 may receive the electrons at the single point and distribute the electrons across the surface of the ion-selective membrane 104. Conversely, the electrically conductive coating 114 may provide a less substantial benefit to the self-priming battery cell 100 when the electron transport structure 112 contacts the ion-selective membrane 104 at a relatively higher number of points or has a relatively greater area of contact with the ion-selective membrane 104 because less distribution of the electrons is needed to supplement the distribution provided by the electron transport structure 112. In some embodiments, the electrically conductive coating 114 can be omitted and the electron distribution can be accomplished by the electron transport structure 112 alone. In other embodiments, the electrically conductive coating 114 and the electron transport structure 112 both perform the function of distributing the electrons across the surface of the ion-selective membrane 104.

The electrically conductive coating 114 can be made of or include any of a variety of electrically conductive materials such as metals, metal oxides, or carbon. In some embodiments, the electrically conductive coating 114 is made of a metal oxide such as indium tin oxide, manganese oxide, titanium oxide, or nickel oxide. In some embodiments, the electrically conductive coating 114 includes one or more conductive sulfides such as, but not limited to, tungsten sulfides (e.g., $WS_2$ having an electrical conductivity of approximately 6.7 Siemens/cm), nickel sulfides (e.g., $NiS_2$ having an electrical conductivity of approximately 2-55 Siemens/cm), titanium sulfides (e.g., $TiS_2$ having an electrical conductivity of approximately 30-50 Siemens/cm), zirconium sulfides (e.g., $ZrS_2$ having an electrical conductivity of approximately 1.32 Siemens/cm), vanadium sulfides (e.g., $VS_2$ having an electrical conductivity of approximately 0.1 Siemens/cm), iron sulfides (e.g., $FeS_2$ having an electrical conductivity of approximately 0.6 Siemens/cm), molybdenum sulfides (e.g., $MoS_2$ having an electrical conductivity of approximately 1,000 Siemens/cm), cobalt sulfides (e.g., $CoS_2$ having an electrical conductivity of approximately 6-5,000 Siemens/cm, $Co_9S_8$ having an electrical conductivity of approximately 290 Siemens/cm), and copper sulfides (e.g., CuS having an electrical conductivity of approximately 870 Siemens/cm, $Cu_2S$ having an electrical conductivity of approximately 6,700 Siemens/cm). In some embodiments, electrically conductive coating 114 is made of a metal capable of alloying with the molten metal (e.g., sodium) produced within the anode compartment 102. For example, the electrically conductive coating 114 may be made of tin, lead, mercury, indium, or any other metal capable of alloying with the molten metal. The electrically conductive coating 114 may have a thickness substantially between 10 nanometers and 10 microns. In some embodiments, the electrically conductive coating 114 has an electrical conductivity substantially between 10 Siemens/cm and $10^6$ Siemens/cm or subranges thereof (e.g., between 10 Siemens/cm and 10 W Siemens/cm, between 100 Siemens/cm and 10 W Siemens/cm, between 100 Siemens/cm and $10^6$ Siemens/cm, etc.).

In some embodiments, the electrically conductive coating 114 is transient or self-dissipating. For example, the electrically conductive coating 114 may be made of a material that dissolves, melts, alloys, or reacts with the molten metal produced within the anode compartment 102. Accordingly, the electrically conductive coating 114 may initially be present on the surface of the ion-selective membrane 104 prior to production of molten metal within the anode compartment 102 (i.e., when the anode compartment 102 is empty of the molten metal prior to the self-priming operation), but may begin to dissipate from the surface of the ion-selective membrane 104 as the molten metal is produced within the anode compartment 102. Upon production of an initial amount of the molten metal within the anode compartment 102, the electrically conductive coating 114 may form an electrically conductive layer between the initial amount of molten metal and the ion-selective membrane 104. However, the electrically conductive coating 114 may dissipate (e.g., dissolve, alloy, react, etc.) in the presence of the molten metal, causing the molten metal to directly contact the surface of the ion-selective membrane 104 after the electrically conductive coating 114 dissipates.

In some embodiments, the electrically conductive coating 114 may be persistent (e.g., long lasting, permanent, etc.) such that the electrically conductive coating 114 stays on the surface of the ion-selective membrane 104 throughout the life of the self-priming battery cell 100. For example, the electrically conductive coating 114 may be made of a material that does not dissolve or react with the molten metal (e.g., a stainless steel coating or mesh that is stable with sodium metal) or does not melt at the temperature of the molten metal within the anode compartment 102. Accordingly, the electrically conductive coating 114 may remain on the surface of the ion-selective membrane 104 even after the anode compartment 102 is filled with the molten metal in some embodiments.

Electron Transport Structures

Referring now to FIGS. 2-10, several examples of different structures that can be used as the electron transport structure 112 in system 1100 are shown, according to various exemplary embodiments. While these examples illustrate a wide range of different structures that could be used, it should be understood that these examples are not the only structures that could be used as the electron transport structure 112 and should not be regarded as limiting. Additionally, it should be noted that the depictions of these structures in the drawings are not necessarily to scale and the sizes/shapes of various components may be exaggerated for ease of illustration and to facilitate explanation of the relevant components and features.

Many of the components shown in FIGS. 2-10 may be the same as or similar to the like-numbered components previously described. For example, the various embodiments are shown to include the anode compartment 102 and the cathode compartment 106 separated by the ion-selective membrane 104. The electrically conductive coating 114 is shown on the surface of the ion-selective membrane 104 facing the anode compartment. In some embodiments, the electrically conductive coating 114 can be formed as an etcher circuit. The anode compartment 102 is shown to include a port 116, which may be located at the top of the anode compartment 102 in some embodiments. As sodium or other molten metal is produced within the anode compartment 102 and the capacity of the anode compartment 102 is reached, excess molten metal may exit the anode compartment 102 via the port 116 and flow into the sodium reservoir 1406 as shown in FIG. 1.

Figure 2:
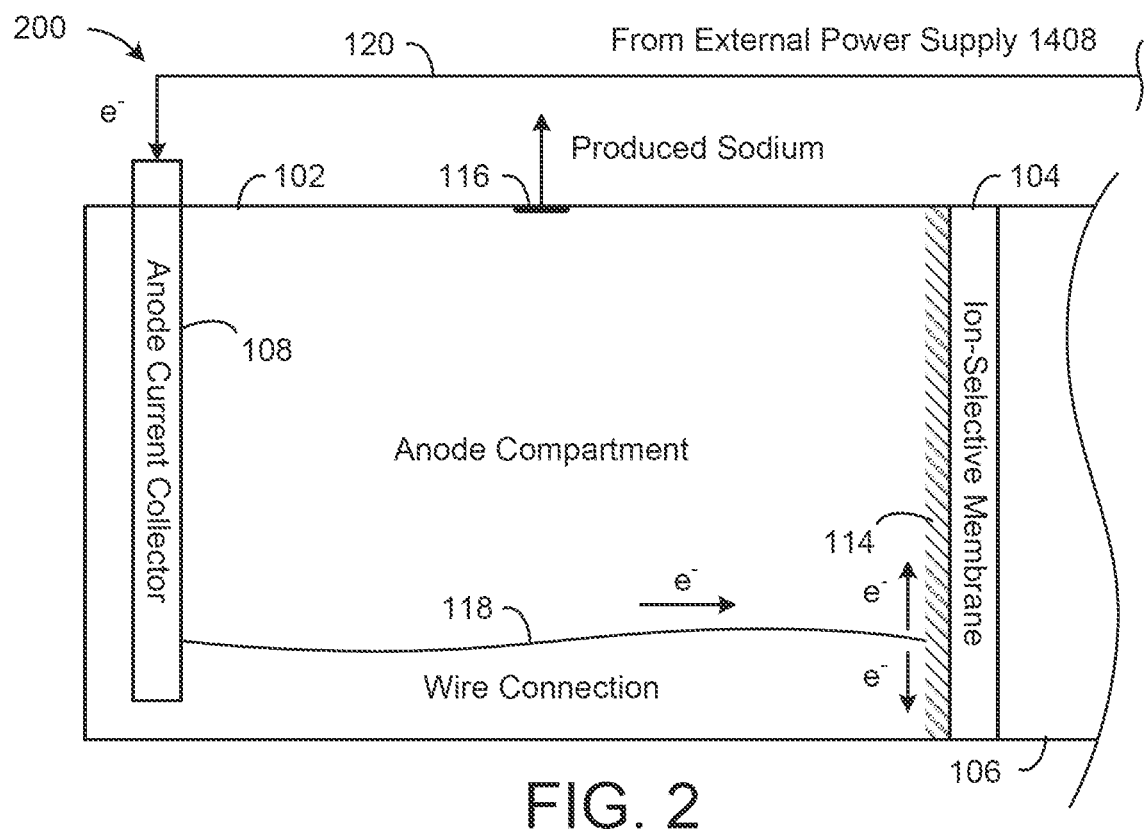
FIG. 2 is a diagram illustrating a wire connection within the anode compartment of the unit cell as an example of the electron transport structure of FIG. 1, according to some embodiments.

Referring specifically to FIG. 2, a first exemplary embodiment 200 is shown, in which the electron transport structure 112 includes a wire 118 electrically connecting the anode current collector 108 with the ion-selective membrane 104 and/or the electrically conductive coating 114 on the surface of the ion-selective membrane 104. One end of the wire 118 may be attached to a surface of the anode current collector 108 within the anode compartment 102, whereas the other end of the wire 118 may be attached to the ion-selective membrane 104 or to the electrically conductive coating 114. Although only a single wire 118 is shown in FIG. 2, it is contemplated that one or more wires 118 can be included.

In operation, electrons from the external power supply 1408 are supplied to the terminal of the anode current collector 108 via a power line 120. The electrons flow through the anode current collector 108, through the anode compartment 102 via the wire 118, and arrive at the electrically conductive coating 114. The electrons are then distributed across the surface of the ion-selective membrane 104 via the electrically conductive coating 114. As the molten metal is produced within the anode compartment 102, the molten metal provides additional electrical paths for the electrons to reach the ion-selective membrane 104, in parallel with the wire 118.

Figure 3:
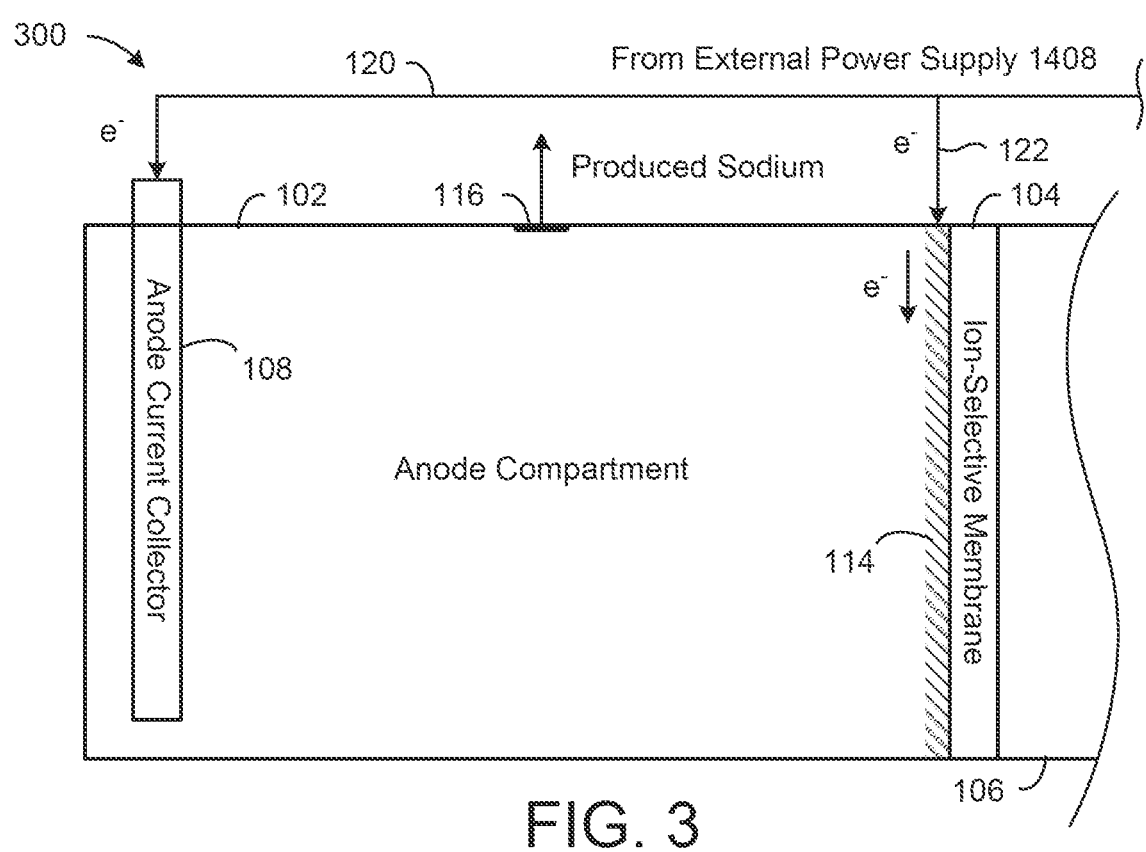
FIG. 3 is a diagram illustrating a wire connection at least partially outside the unit cell as an example of the electron transport structure of FIG. 1, according to some embodiments.

Referring now to FIG. 3, another exemplary embodiment 300 is shown, in which the electron transport structure 112 includes a power line 122 at least partially external to the anode compartment 102. Unlike embodiment 200 in which the wire 118 extends between the anode current collector 108 and the ion-selective membrane 104 and/or the electrically conductive coating 114 inside the anode compartment 102, the power line 122 in embodiment 300 connects directly to the power line 120 from the external power supply 1408 bypassing the anode current collector 108.

In operation, electrons from the external power supply 1408 are supplied to both the power line 120 and the power line 122 in parallel. For example, the power lines 120 and 122 may be separate branches that extend from the external power supply 1408. The power line 120 connects to the anode current collector 108, whereas the power line 122 connects to the ion-selective membrane 104 and/or the electrically conductive coating 114. The electrons flow through the power line 122 and arrive at the electrically conductive coating 114. The electrons are then distributed across the surface of the ion-selective membrane 104 via the electrically conductive coating 114. As the molten metal is produced within the anode compartment 102, the molten metal provides additional electrical paths for the electrons to reach the ion-selective membrane 104 by traveling between the anode current collector 108 and the ion-selective membrane 104 within the anode compartment 102.

Figure 4:
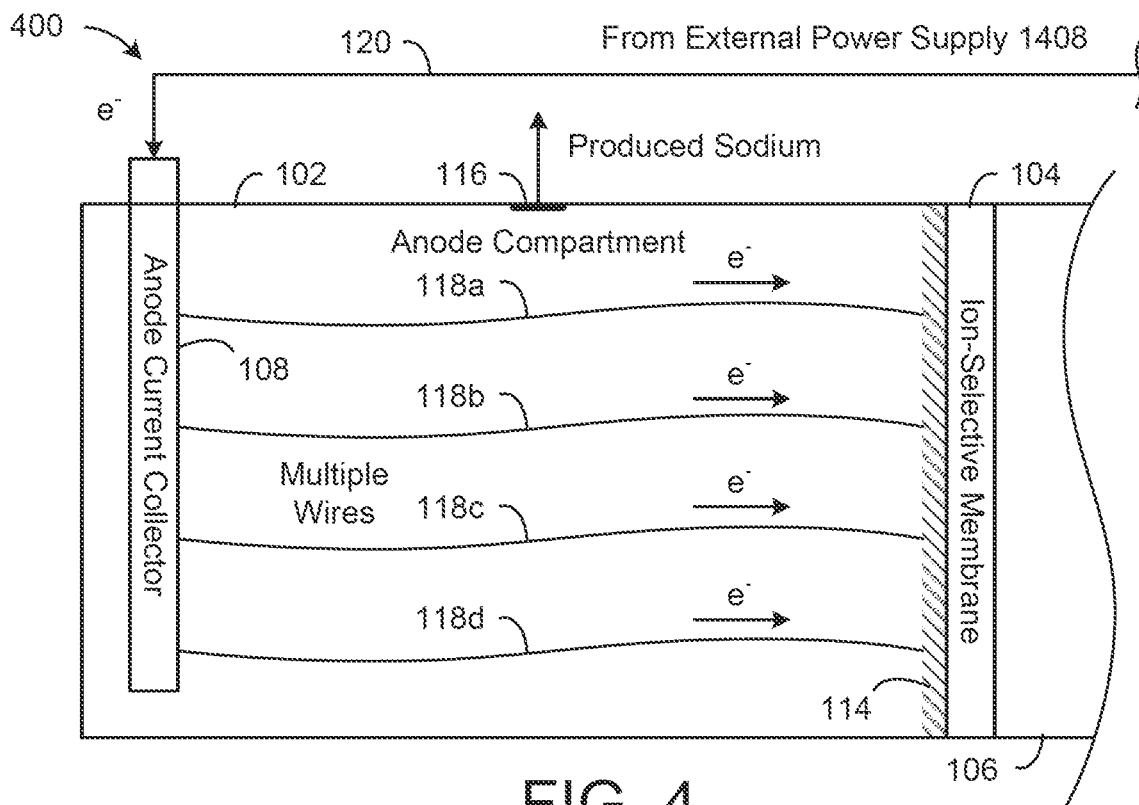
FIG. 4 is a diagram illustrating multiple wires within the anode compartment of the unit cell as an example of the electron transport structure of FIG. 1, according to some embodiments.

Referring now to FIG. 4, another exemplary embodiment 400 is shown, in which the electron transport structure 112 includes multiple wires 118a, 118b, 118c, and 118d. Each of the wires 118a, 118b, 118c, and 118d may be an instance of the wire 118 shown in FIG. 2 and may electrically connect the anode current collector 108 with the ion-selective membrane 104 and/or the electrically conductive coating 114 within the anode compartment 102. In some embodiments, the wires 118a, 118b, 118c, and 118d are extensions of the anode current collector 108 and may be formed as an integral component with the anode current collector 108.

Although only four wires 118a, 118b, 118c, and 118d are shown in FIG. 4, it is contemplated that any number of wires can be included.

In operation, electrons from the external power supply 1408 are supplied to the terminal of the anode current collector 108 via the power line 120. The electrons flow through the anode current collector 108, through the anode compartment 102 via the multiple wires 118a, 118b, 118c, and 118d, and arrive at the electrically conductive coating 114 and/or the ion-selective membrane 104. In some embodiments, the electrons are then distributed across the surface of the ion-selective membrane 104 via the electrically conductive coating 114. Alternatively, the electrically conductive coating 114 may be omitted because the multiple wires 118a, 118b, 118c, and 118d may adequately distribute the electrons across the surface of the ion-selective membrane 104 without requiring the electrically conductive coating 114 to perform this function. However, the electrically conductive coating 114 may also be included in embodiment 400 if desired. As the molten metal is produced within the anode compartment 102, the molten metal provides additional electrical paths for the electrons to reach the ion-selective membrane 104, in parallel with the wires 118a, 118b, 118c, and 118d.

Figure 5:
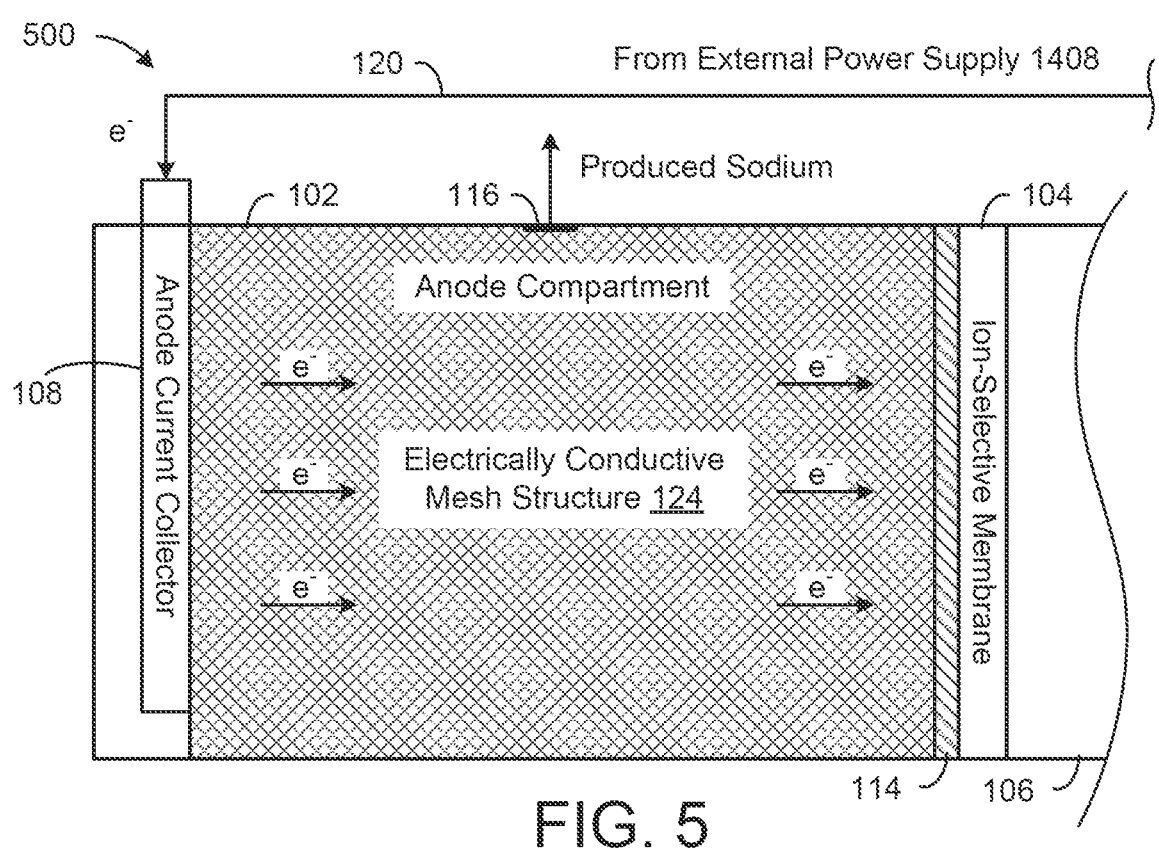
FIG. 5 is a diagram illustrating an electrically conductive mesh within the anode compartment of the unit cell as an example of the electron transport structure of FIG. 1, according to some embodiments.

Referring now to FIG. 5, another exemplary embodiment 500 is shown, in which the electron transport structure 112 includes an electrically conductive mesh structure 124 within the anode compartment 102. The electrically conductive mesh structure 124 may include a three-dimensional mesh, grid, framework, lattice, scaffold, foam, or any other type of structure capable of conducting electric current between the anode current collector 108 and the ion-selective membrane 104 and/or the electrically conductive coating 114. In some embodiments, the electrically conductive mesh structure 124 also provides structural support to the anode compartment 102. For example, the electrically conductive mesh structure 124 may contact the surfaces of the anode current collector 108, the ion-selective membrane 104, or other internal surfaces within the anode compartment 102 and may carry or transmit compressive force to structurally support the anode compartment 102 from within. The electrically conductive mesh structure 124 may include pores, gaps, empty space, hollow regions, or other unoccupied volume within the framework or mesh structure to provide space for the molten metal produced within the anode compartment 102 to accumulate within the electrically conductive mesh structure 124. In some embodiments, the electrically conductive mesh structure 124 is substantially permeable to gas or liquid and may permit the molten metal to flow through the electrically conductive mesh structure 124 (e.g., may allow the molten metal to exit the anode compartment 102 via the port 116). The electrically conductive mesh structure 124 may occupy some or all of the space within the anode compartment 102.

In operation, electrons from the external power supply 1408 are supplied to the terminal of the anode current collector 108 via the power line 120. The electrons flow through the anode current collector 108 and into the electrically conductive mesh structure 124. The electrically conductive mesh structure 124 transports the electrons across the anode compartment 102 and makes electrical contact with the ion-selective membrane 104 and/or the electrically conductive coating 114. In some embodiments, the electrons are distributed across the surface of the ion-selective membrane 104 via the electrically conductive coating 114. Alternatively, the electrically conductive coating 114 may be omitted because the electrically conductive mesh structure 124 may adequately distribute the electrons across the surface of the ion-selective membrane 104 without requiring the electrically conductive coating 114 to perform this function. However, the electrically conductive coating 114 may also be included in embodiment 500 if desired. As the molten metal is produced within the anode compartment 102, the molten metal fills the gaps or empty space within the electrically conductive mesh structure 124 and provides additional electrical paths for the electrons to reach the ion-selective membrane 104.

Figure 6:
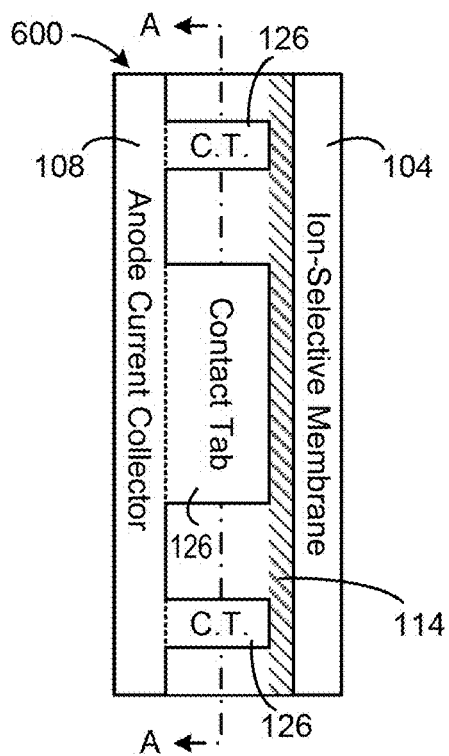
FIG. 6 is a side view of a unit cell illustrating contact tabs extending from the anode current collector as an example of the electron transport structure of FIG. 1, according to some embodiments.
Figure 7:
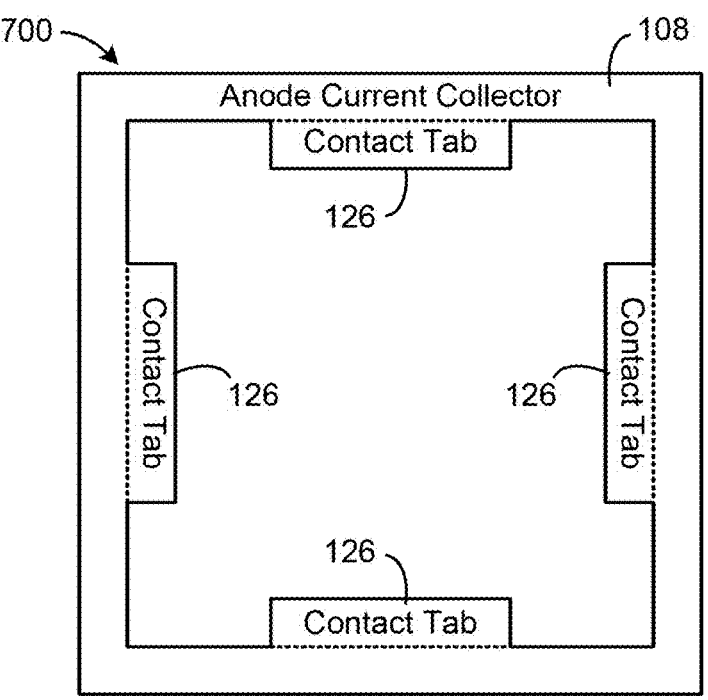
FIG. 7 is a cross-sectional view of the unit cell of FIG. 6 taken along the line A-A, according to some embodiments.

Referring now to FIGS. 6 and 7, a side view 600 and cross-sectional view 700 of another exemplary embodiment of the electron transport structure 112 is shown. In this embodiment, the anode current collector 108 is shown as frame having several contact tabs 126 extending from edges of the frame. For example, the anode current collector 108 may be a substantially rectangular frame as shown in FIG. 7 or may have any other shape (e.g., circular, elliptical, etc.). In some embodiments, the anode current collector 108 includes a substantially flat plate with a raised frame along the edges of the plate. The raised frame may extend in a direction substantially perpendicular to the plate (e.g., toward the ion-selective membrane 104). The contact tabs 126 may extend inward from the edges of the frame as shown in FIG. 7 and/or toward the ion-selective membrane 104 as shown in FIG. 6. In some embodiments, the contact tabs 126 are integral with the anode current collector 108 and may be formed along with the anode current collector 108 as a single unitary component. The contact tabs 126 may extend between the anode current collector 108 and the ion-selective membrane 104 and/or the electrically conductive coating 114 to provide an electrical pathway therebetween.

In operation, electrons from the external power supply 1408 are supplied to the terminal of the anode current collector 108 via the power line 120 as described above. The electrons flow through the anode current collector 108 and across the anode compartment 102 via the contact tabs 126, and arrive at the electrically conductive coating 114 and/or the ion-selective membrane 104. In some embodiments, the electrons are then distributed across the surface of the ion-selective membrane 104 via the electrically conductive coating 114. Alternatively, the electrically conductive coating 114 may be omitted and the electrons may flow directly from the contact tabs 126 to the ion-selective membrane 104 at the points of contact. As the molten metal is produced within the anode compartment 102, the molten metal provides additional electrical paths for the electrons to reach the ion-selective membrane 104, in parallel with the contact tabs 126.

Figure 8:
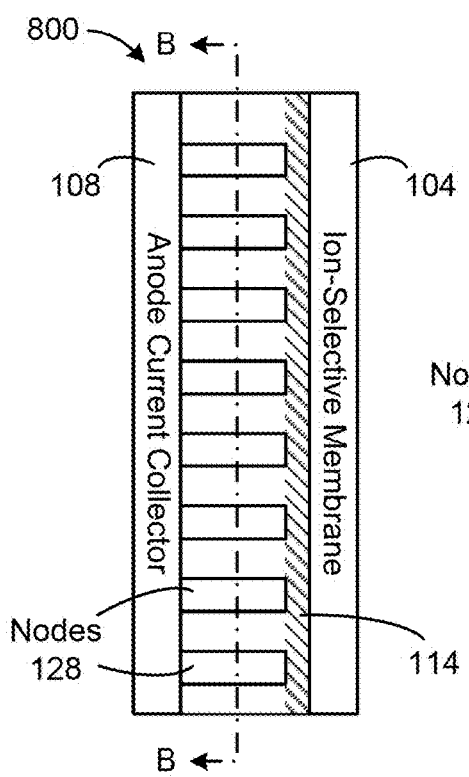
FIG. 8 is a side view of a unit cell illustrating nodes extending from the anode current collector as an example of the electron transport structure of FIG. 1, according to some embodiments.
Figure 9:
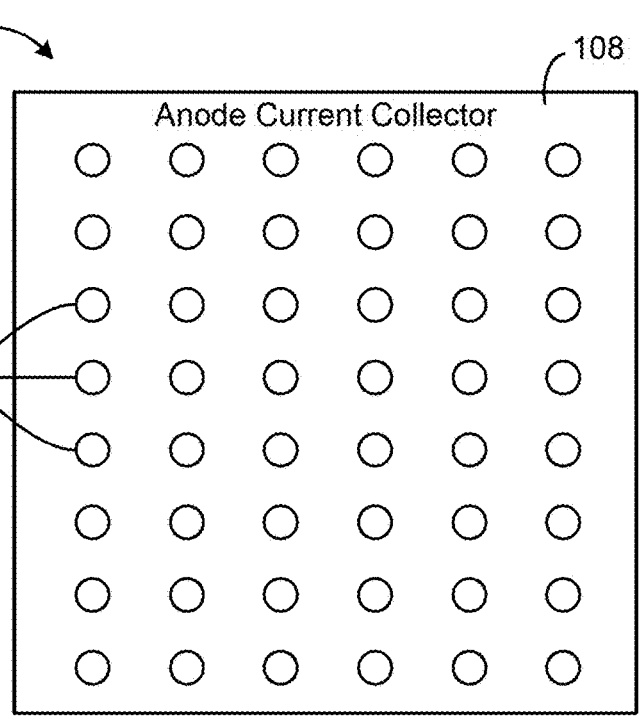
FIG. 9 is a cross-sectional view of the unit cell of FIG. 8 taken along the line B-B, according to some embodiments.

Referring now to FIGS. 8 and 9, a side view 800 and cross-sectional view 900 of another exemplary embodiment of the electron transport structure 112 is shown. In this embodiment, the anode current collector 108 is shown to include several nodes 128 distributed across the surface of the anode current collector 108. The nodes 128 may have any of a varieties of sizes or shapes. In some embodiments, the nodes 128 are hemispherical domes extending from the surface of the anode current collector 108 toward the ion-selective membrane 104. In some embodiments, the nodes 128 are cylindrical columns, rectangular columns, or any other shape that extends from the surface of the anode current collector 108 toward the ion-selective membrane 104. The nodes 128 may be arranged in an array or grid as shown in FIG. 9 and may make contact with the ion-selective membrane 104 and/or the electrically conductive coating 114 at multiple locations. In some embodiments, the nodes 128 are integral with the anode current collector 108 and may be formed along with the anode current collector 108 as a single unitary component. The nodes 128 may extend between the anode current collector 108 and the ion-selective membrane 104 and/or the electrically conductive coating 114 to provide an electrical pathway therebetween.

In operation, electrons from the external power supply 1408 are supplied to the terminal of the anode current collector 108 via the power line 120 as described above. The electrons flow through the anode current collector 108 and across the anode compartment 102 via the contact nodes 128, and arrive at the electrically conductive coating 114 and/or the ion-selective membrane 104. In some embodiments, the electrons are then distributed across the surface of the ion-selective membrane 104 via the electrically conductive coating 114. Alternatively, the electrically conductive coating 114 may be omitted and the electrons may flow directly from the nodes 128 to the ion-selective membrane 104 at the points of contact. As the molten metal is produced within the anode compartment 102, the molten metal provides additional electrical paths for the electrons to reach the ion-selective membrane 104, in parallel with the nodes 128.

Figure 10:
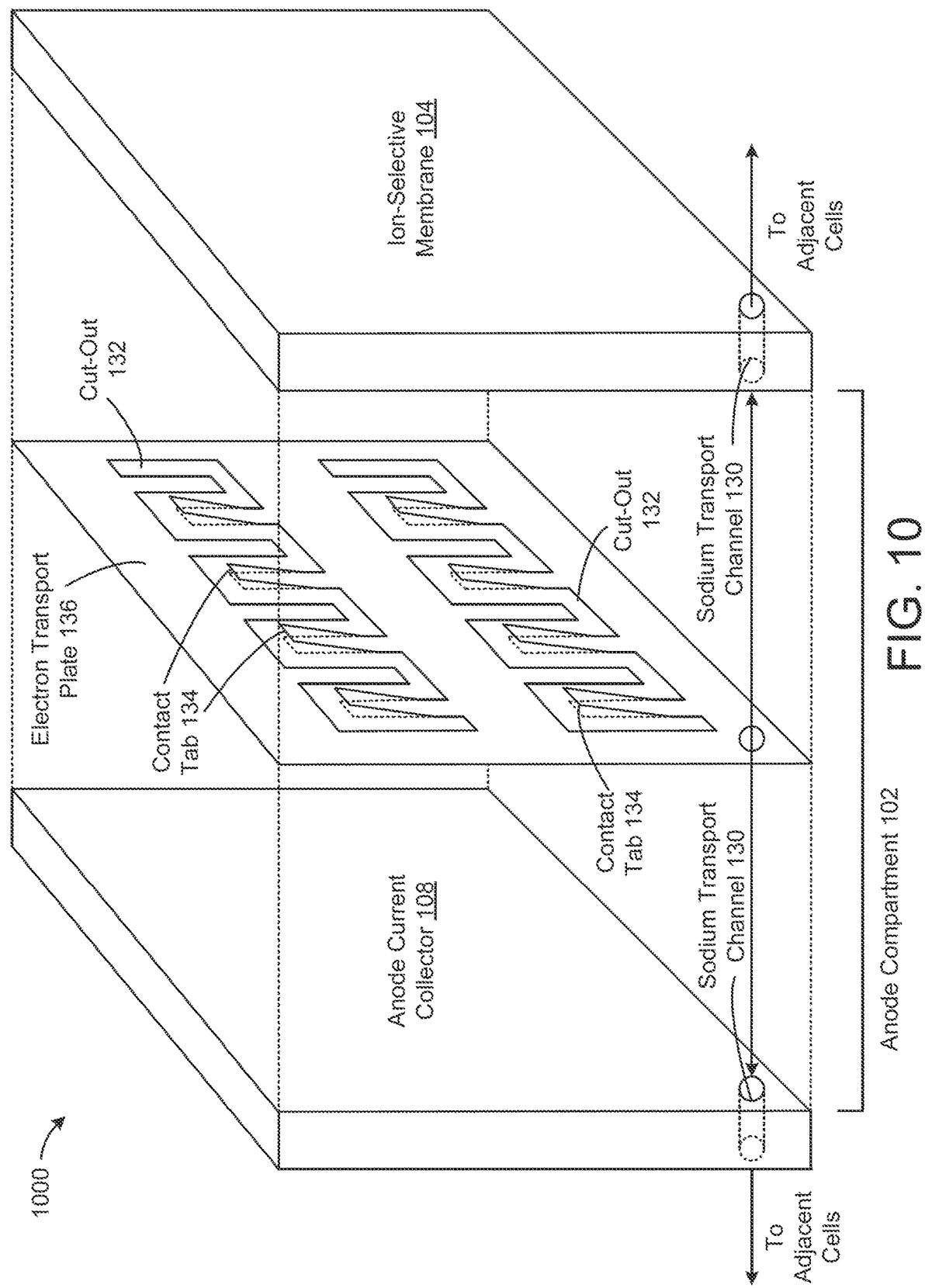
FIG. 10 is a perspective view of a unit cell illustrating an electron transport plate with cutouts and contact tabs as an example of the electron transport structure of FIG. 1, according to some embodiments.

Referring now to FIG. 10, another exemplary embodiment 1000 is shown, in which the electron transport structure 112 includes an electron transport plate 136 with several contact tabs 134 extending therefrom. The electron transport plate 136 may be a substantially planar surface that makes electrical contact with the anode current collector 108 along one side of the electron transport plate 136 (i.e., the left side in FIG. 10). The electron transport plate 136 is shown to include cutouts 132, which may be holes extending through the electron transport plate 136. In some embodiments, the cutouts 132 are formed by stamping out one or more regions of the electron transport plate 136 during manufacturing. The cutouts 132 may have any of a variety of sizes or shapes, such as serpentine pathways having curved or rectangular corners as shown in FIG. 10. The contact tabs 134 may be portions of the electron transport plate 136 that have been bent in a direction substantially perpendicular to the planar surface of the electron transport plate 136. In some embodiments, each of the contact tabs 134 is connected to the remainder of the electron transport plate 136 along one edge and are bent along the connecting edge. The contact tabs 134 may be bent toward the ion-selective membrane 104 and may make electrical contact with the ion-selective membrane 104 (e.g., either directly or via the electrically conductive coating 114) when the electron transport plate 136 is placed between the anode current collector 108 and the ion-selective membrane 104 within the anode compartment 102.

In operation, electrons from the external power supply 1408 are supplied to the terminal of the anode current collector 108 via the power line 120 as described above. The electrons flow through the anode current collector 108, into the electron transport plate 136, and arrive at the electrically conductive coating 114 and/or the ion-selective membrane 104 via the contact tabs 134. In some embodiments, the electrons are then distributed across the surface of the ion-selective membrane 104 via the electrically conductive coating 114. Alternatively, the electrically conductive coating 114 may be omitted and the electrons may flow directly from the contact tabs 134 to the ion-selective membrane 104 at the points of contact. As the molten metal is produced within the anode compartment 102, the molten metal provides additional electrical paths for the electrons to reach the ion-selective membrane 104, in parallel with the electron transport plate 136 and the contact tabs 134. In some embodiments, the anode compartment 102 includes sodium transport channels 130 to allow the sodium or other molten metal to flow to the anode compartments 102 of other cells. The sodium transport channels 130 may pass through the electron transport plate 136, the anode current collector 108, and/or the ion-selective membrane 104 as shown in FIG. 10.

Battery System

Referring generally to FIGS. 11-31, an example of a molten sodium battery system 1100 that can use the self-priming battery cell 100 is shown, according to an exemplary embodiment. Although a different reference number is used to refer to the battery cells 1700 of system 1100, it should be understood that the self-priming battery cell 100 may be an embodiment of the battery cells 1700 and/or can be used in system 1100 in place of or in addition to any of the battery cells 1700. It is contemplated that any of the components or functions of the self-priming battery cell 100 can be added to or included in the battery cells 1700 and can be combined with any of the components or functions previously described without departing from the teachings of the present disclosure.

Overview

In some battery systems, it is desirable to electrically connect multiple battery cells in series with each other such that the individual cell voltages provided by the battery cells stack to provide a greater voltage for the battery system as a whole. The principle of electrically connecting multiple battery cells in series can be readily applied to most types of batteries including flow batteries. A flow battery constructed in this manner typically has a single catholyte fluid circuit that circulates the catholyte through the cathode side of each battery cell, which can be arranged fluidly in parallel or fluidly in series with each other. Similarly, the flow battery may include a single anolyte fluid circuit that circulates the anolyte through the anode side of each battery cell, which can be arranged fluidly in parallel or fluidly in series with each other.

However, attempting to connect multiple molten sodium battery cells in series with each other can be challenging because the molten sodium metal has a high electrical conductivity (i.e., approximately $1 \times 10^6$ mS/cm at 98° C.) which is several orders of magnitude higher than the electrical conductivities of conventional battery electrolytes (i.e., approximately 500 mS/cm at 50° C. for conventional aqueous electrolytes, approximately 50 mS/cm at 115° C. for conventional non-aqueous or organic electrolytes). This can be problematic because electric current can flow between the molten sodium battery cells via the molten sodium metal, which equalizes the electric potential (i.e., voltage) across the battery cells and prevents the cell voltages from stacking when electrically connected in series. The present disclosure addresses these and other challenges that arise in molten sodium battery systems.

The molten sodium battery system described herein may include one or more secondary cells (i.e., rechargeable battery cells), each of which includes a molten sodium metal anode, an ion-selective membrane (the term "membrane" used herein to refer to any suitable type of separator), and a cathode compartment through which a catholyte circulates (e.g., via an external pump). The ion-selective membrane is positioned between the molten sodium metal anode and the catholyte compartment and permits positively charged sodium cations ($Na^+$) to pass through when charging or discharging the secondary cell.

In some embodiments, multiple secondary cells (referred to herein as "unit cells," "battery cells," "secondary cells," or like terms) are arranged in series and/or in parallel with each other to form a battery string (referred to herein as "strings," "battery strings," or like terms). Each battery string may include one or more unit cells. In some embodiments, the unit cells within a battery string are arranged electrically in parallel with each other. For example, a battery string may include 10 (or any number) of unit cells that each operate at 1.5 Volts (V) and 20 Amps (A) and can be electrically connected in parallel with each other such that the battery string has a combined voltage of 1.5V and electric current of 200 A. The sodium metal and catholyte fluid may flow through each of the unit cells within a battery string in parallel with each other, in series with each other, or any combination thereof. Multiple battery strings can be connected together to form a stack. For example, a stack may include 16 (or any number) of battery strings electrically connected in series with each other (e.g., via electrical bus bars) such that the stack has a stack voltage of 24V and electric current of 200 A. Although specific voltages and current values are provided herein as examples, it should be noted that these values can vary and should not be regarded as limiting. The sodium metal may flow through each of the battery strings within a stack in parallel with each other, whereas the catholyte fluid may flow through each of the battery strings within a stack in series with each other, in parallel with each other, or in any combination thereof.

The molten sodium battery system can operate in multiple modes including a flow battery mode and a sodium production mode. In past systems, each string would receive a string-specific flow of priming sodium from a sodium distributor to initially fill or "prime" the unit cells. The sodium distributor may be configured to receive the sodium from an external sodium source and distribute the sodium to each of the strings in parallel with each other. Advantageously, the sodium distributor may be configured to keep the strings electrically isolated from each other by preventing electric current from flowing between the strings via the string-specific flows of priming sodium and/or via a structure (e.g., walls, surfaces, etc.) of the sodium distributor. Once the unit cells are primed with an initial amount of sodium, the sodium distributor is no longer needed. These and other features of the sodium distributor are described in greater detail below. As an alternative to using the sodium distributor to initially fill or prime the unit cells, the self-priming battery cell 100 may be used to provide unit cells that are self-priming and do not require the sodium distributor to provide sodium to the strings from an external sodium source.

In flow battery mode, the molten sodium battery system can operate to charge the battery or discharge the battery. When charging the battery, electricity is consumed and $Na^+$ ions pass through the ion-selective membrane from the catholyte and join with electrons ($e^-$) on the anode side of the membrane (i.e., within the molten sodium anode) to form sodium metal (Na) as described above. The sodium metal produced within the molten sodium anodes is forced out of the unit cells (e.g., as a result of the produced sodium occupying more volume within the sodium anode) via string-specific sodium outlets and flows into string-specific sodium reservoirs. In some embodiments, the string-specific sodium reservoirs are located physically above the battery strings (i.e., having higher gravitational potential energy) and serve as additional capacity to store the sodium metal produced when charging the battery. When discharging the battery, the opposite reaction occurs. Sodium metal flows into the molten sodium anodes of the unit cells from the string-specific sodium reservoirs and is consumed within the unit cells to produce sodium ions $Na^+$ and electrons. The $Na^+$ ions pass through the ion-selective membrane and react with the catholyte, while the electrons are discharged from the battery in the form of electricity. The string-specific sodium reservoirs are physically and electrically isolated from each other such that each string only provides sodium into a single sodium reservoir and receives sodium from that same sodium reservoir.

In sodium production mode, the molten sodium battery system operates in a manner similar to when the battery is charging in flow battery mode. Electricity is consumed and $Na^+$ ions pass through the ion-selective membrane from the catholyte and join with electrons ($e^-$) on the anode side of the membrane (i.e., within the molten sodium anode) to form sodium metal (Na) as described above. The sodium metal produced within the molten sodium anodes is forced out of the unit cells via string-specific sodium outlets. However, in sodium production mode, the produced sodium does not need to be stored in string-specific sodium reservoirs. Instead of providing each string-specific flow of produced sodium to a separate reservoir, the string-specific flows of produced sodium are delivered to a sodium aggregator. The sodium aggregator receives a string-specific flow of sodium from multiple strings, aggregates (e.g., combines, collects, merges, etc.) the string-specific flows of sodium into a single sodium pool, and delivers the aggregated sodium to an external sodium storage vessel. Advantageously, the sodium aggregator may be configured to keep the strings electrically isolated from each other by preventing electric current from flowing between the strings via the string-specific flows of sodium and/or via a structure (e.g., walls, surfaces, etc.) of the sodium aggregator. These and other features of the sodium aggregator are described in greater detail below.

Battery System Components

Figure 11:
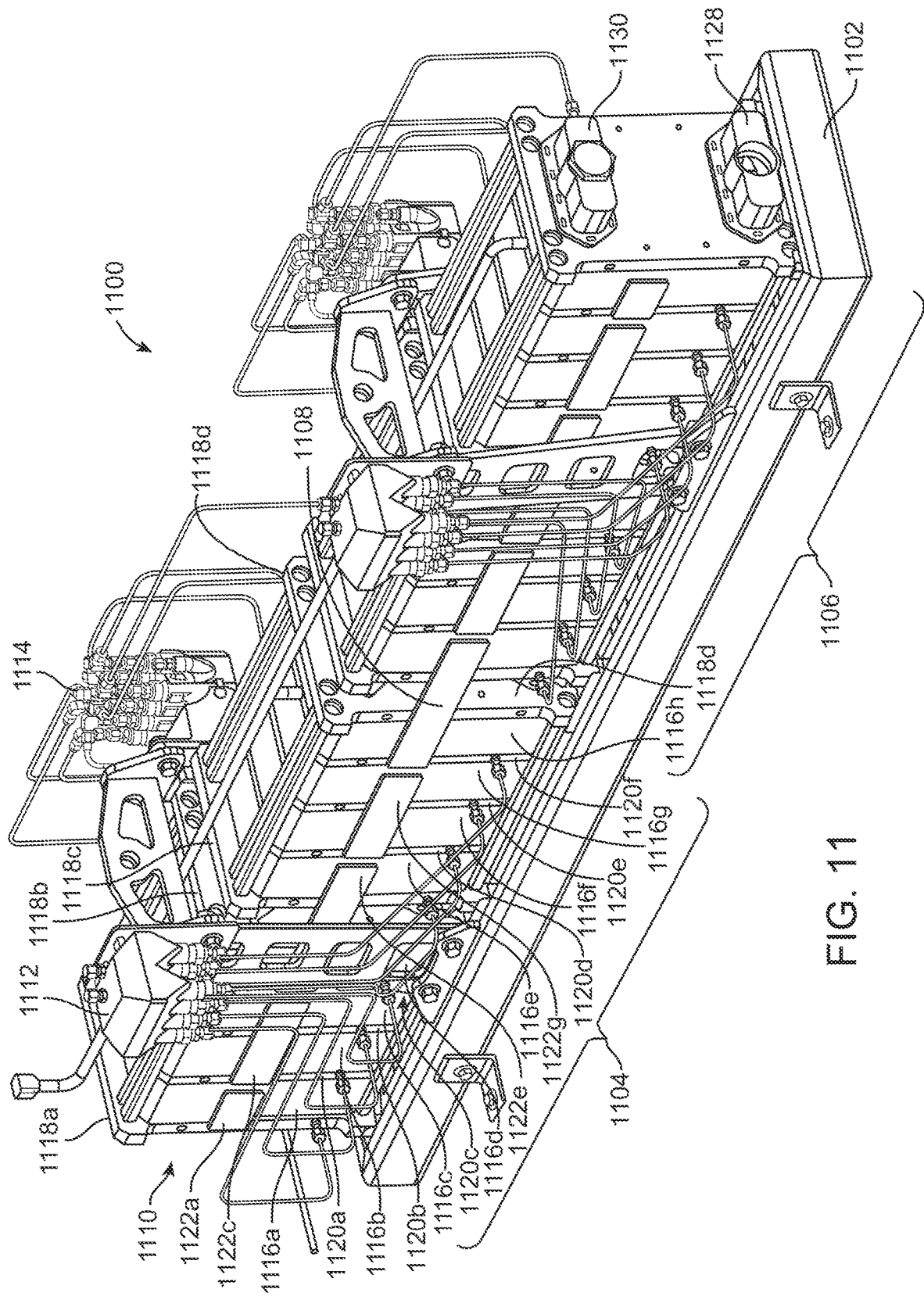
FIG. 11 is a first perspective view of a molten sodium battery system that can use the self-priming battery cell of FIG. 1, according to some embodiments.
Figure 12:
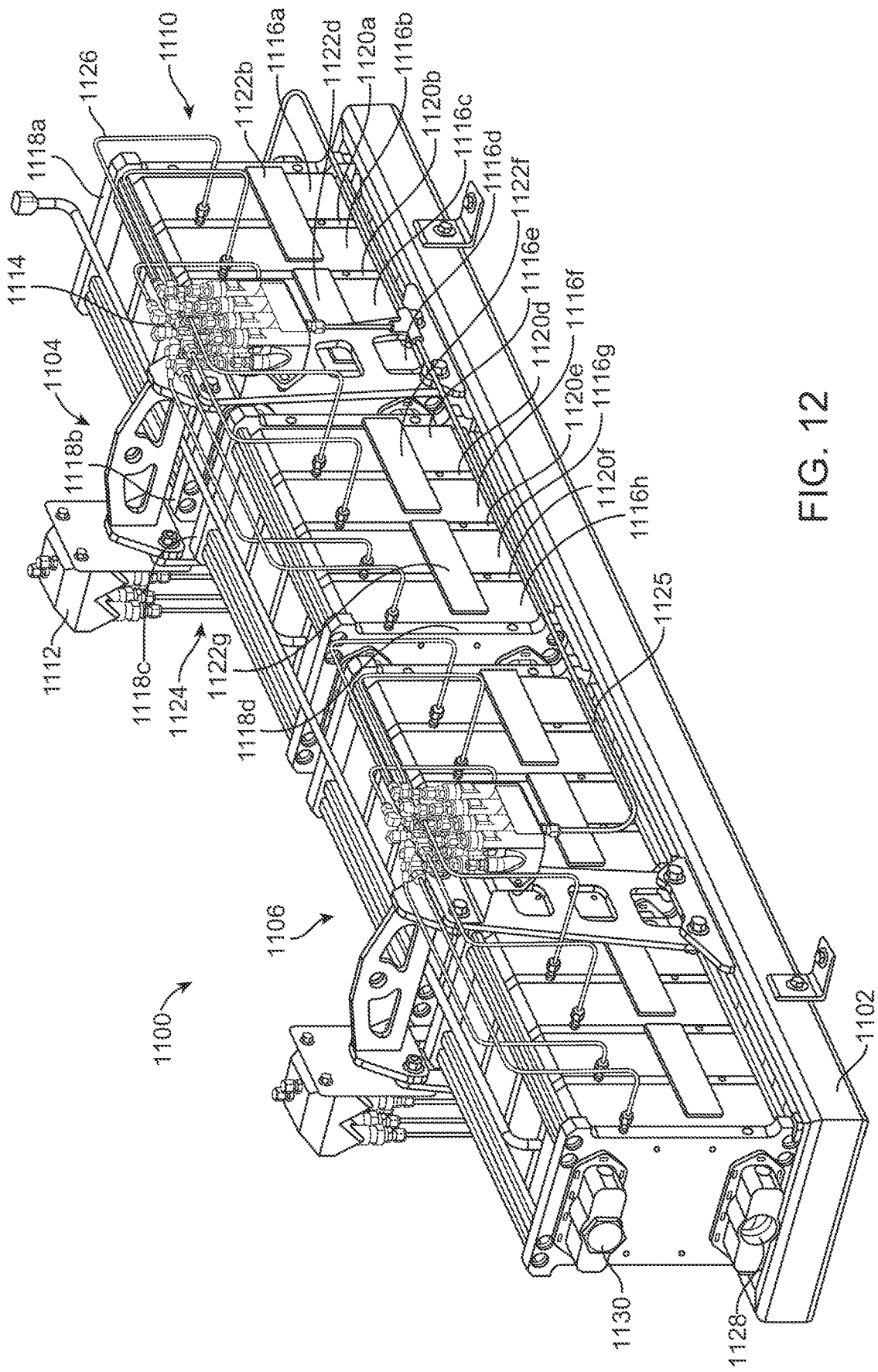
FIG. 12 is a second perspective view of the system of FIG. 11, according to some embodiments.

Referring now to FIGS. 11-12, perspective views of the system 1100 is shown, according to some embodiments. The system 1100 can be a flow battery system, a molten alkali metal battery system, a molten sodium battery system, an alkali metal production system, a sodium production system, etc. In some embodiments, the system 1100 includes some or all of the features or components of the system described in U.S. Provisional Patent Application No. 63/294,658 filed Dec. 29, 2021, the entire disclosure of which is incorporated by reference herein. The system 1100 is shown to include a base 1102, a first subsystem 1104 mounted on the base 1102, and a second subsystem 1106 mounted on the base 1102. The first subsystem 1104 and the second subsystem 1106 may be connected in series by a first bus bar 1108. The first subsystem 1104 and the second subsystem 1106 may be configured substantially the same.

The first subsystem 1104 is shown as including a stack assembly 1110, a distributor 1112 (e.g., sodium distributor, priming distributor), and an aggregator 1114 (e.g., sodium aggregator, shunt break). The stack assembly 1110 includes multiple strings 1116 (shown as strings 1116*a-h*). In the example shown, the strings 1116 of stack assembly 1110 are grouped in sets of four strings 1116 (e.g., strings 1116*a-d* and 1116*e-h*) with each group of strings 1116 bounded by end plates 1118*a-d*. The strings 1116 within each group are separated from each other by isolation plates 1120 (shown isolation plates 1120*a-f*) configured to fluidly and electrically isolate adjacent strings 1116 from each other. The stack assembly 1110 also includes bus bars 1122 (shown as bus bars 1122*a-g*) that provide electrical connections between the strings 1116 (i.e., electrically connect the strings 1116 in series with each other) as described in further detail with reference to FIG. 13.

Each string 1116 includes a housing defined at least by an exterior wall which is visible in FIGS. 11-12. As shown in other figures and described with reference thereto, each string 1116 includes one or more cells (e.g., battery cells, unit cells, secondary cells, etc.) which can charge to store electricity, for example by reducing sodium cations (i.e., adding an electron to an $Na^+$ ion) to produce sodium atoms (Na), and discharge to produce electricity, for example by oxidizing sodium metal (i.e., splitting an electron from a sodium atom) to produce sodium cations $Na^+$. The isolation plates 1120 provide electrical isolation between neighboring strings 1116. End plates 1118 also provide electrical isolation and structural support for the stack assembly 1110.

The distributor 1112 is configured to distribute an electrically conductive fluid (e.g., fluid alkali metal, molten sodium) to the multiple strings 1116 from a common source or inlet (e.g., an external sodium source) while providing for electrical isolation between the strings 1116. The distributor 1112 is connected to the multiple strings 1116 by tubing 1124 (e.g., one tube for each string 1116*a-g*; eight tubes in the example shown) such that fluid can flow therebetween. As shown in FIGS. 11-12, the distributor 1112 is mounted physically above the stack assembly 1110 such that the force of gravity on the fluid in the distributor 1112 will cause the fluid to flow downward toward/into the strings 1116 and completely fill the strings 1116*a-g*. Additional details of the distributor 1112 and the electrical isolation provided thereby are described with reference to FIGS. 19-22. Although the distributor 1112 is shown in FIGS. 11-12, it should be understood that the distributor 1112 is not needed for embodiments of system 1100 that include the self-priming battery cells 100 because there is no need to distribute sodium to the strings 1116 from an external source. As such, the distributor 1112 can be omitted in some embodiments of system 1100.

The aggregator 1114 is configured to receive an electrically conductive fluid (e.g., fluid alkali metal, fluid sodium) from the multiple strings 1116*a-g* and aggregate the electrically conductive fluid in a common receptacle or at a common outlet (e.g., via line 1125) while providing for electrical isolation between the strings 1116. The aggregator 1114 is connected to the multiple strings 1116 by tubing 1126 (e.g., one tube for each string 1116; eight tubes in the example shown) such that fluid can flow therebetween. As shown in FIGS. 11-12, the aggregator 1114 is mounted physically above the stack assembly 1110 such that the fluid is required to flow against the direction of gravity when flowing from the stack assembly 1110 into the aggregator 1114. This may occur as a result of the electrically conductive fluid being produced within the stack assembly 1110 and forced out of the stack assembly as additional mass/volume of the electrically conductive fluid is produced. Details of the aggregator 1114 and the electrical isolation provided thereby are provided below, for example with reference to FIGS. 23-26.

The distributor 1112 and the aggregator 1114 operate to deliver string-specific flows of the electrically conductive fluid to the strings 1116 in parallel with each other and collect/aggregate string-specific flows of the electrically conductive fluid from the strings 1116 in parallel with each other. The distributor 1112 receives the electrically conductive fluid from an external source, divides the electrically conductive fluid into string-specific flows, and delivers the string-specific flows to the individual strings 1116. Within the stack assembly 1110, the string-specific flows of the electrically conductive fluid are maintained fluidly and electrically isolated from each other by the isolation plates 1120 and end plates between adjacent strings 1116 to prevent electrical current from flowing between adjacent strings 1116 via the electrically conductive fluid. The aggregator receives string-specific flows of the electrically conductive fluid from the individual strings 1116, combines or aggregates the string-specific flows into a single merged stream, and provides the merged stream of the electrically conductive fluid to an external storage vessel.

In some embodiments, the flows of the electrically conductive fluid between the distributor 1112, the strings 1116, the aggregator 1114, and/or other components of system 1100 occur passively and thus can be characterized as passive flows. Passive flows may include flows that are driven by gravity, naturally induced fluid currents (e.g., convection currents), displacement (e.g., fluid expansion or generation within the strings 1116), or otherwise passively occur without requiring an active (e.g., powered) component such as a pump, compressor, fan, etc. to drive the flow. For example, the distributor 1112, the external fluid source that feeds the distributor 1112, and/or the string-specific reservoirs may be positioned above the strings 1116 (e.g., directly above the strings 1116 and/or an elevation above the strings 1116 but horizontally to the side of the strings 1116) such that the force of gravity causes the electrically conductive fluid to passively flow downward from such components into the strings 1116 when space is available within the strings 1116. This may occur when priming the strings 1116 and/or when consuming the electrically conductive fluid within the strings 1116 (e.g., during flow battery discharging mode) to free space within the strings 1116. As another example, production of the electrically conductive fluid within the strings 1116 (e.g., during sodium production mode or flow battery charging mode) may cause the mass of the electrically conductive fluid to increase within the strings 1116. The increased mass of the electrically conductive fluid within the strings 1116 may cause an increase in fluid pressure and/or volume within the strings 1116, which may cause excess electrically conductive fluid that does not fit within the strings 1116 to be forced out of the strings 1116 by displacement. The displaced electrically conductive fluid may flow passively out of the strings 1116 against the direction of gravity as additional mass of the electrically conductive fluid is produced within the strings 1116 and into the aggregator 1114 and/or external reservoirs positioned above the strings 1116.

The second subsystem 1106 is configured substantially the same as the first subsystem 1106, and includes a comparable or identical stack assembly, distributor, and aggregator. As shown in FIGS. 11-12, an inlet port 1128 and an outlet port 1130 are positioned at one end of the second subsystem 1106. In other embodiments, the inlet port 1128 and the outlet port 1130 are at opposite ends of the second subsystem 1106. A similar inlet port and outlet port can be provided on end plate 1118a and/or end plate 1118d (e.g., an inlet port on end plate 1118a and an outlet port on end plate 1118d). The inlet port 1128 provides an entry point for flow of a catholyte into the second subsystem and the outlet port 1130 provides an exit point for flow of the catholyte out of the second subsystem. The catholyte may flow through cells of the system 1100, as shown in FIGS. 14-18 and described with reference thereto.

The catholyte may include any suitable type of positive electrolyte or positive electrode solution. In some embodiments, the catholyte can be or include any type of fluid capable of exchanging ions (e.g., sodium ions or other cations) with the electrically conductive fluid. Examples of suitable catholytes include but are not limited to sodium sulfides, sodium halides, aluminum sulfides, aluminum halides, and/or any of the positive electrolytes or positive electrode solutions described in U.S. Pat. No. 10,734,686 granted Aug. 4, 2020, U.S. Pat. No. 8,968,902 granted Mar. 3, 2015, U.S. Patent Application Publication No. 2021/0280898 published Sep. 9, 2021, and/or U.S. Patent Application Publication No. 2021/0277529 published Sep. 9, 2021. The entire disclosure of each of these patents and patent application publications is incorporated by reference herein. The catholyte may flow through cathode compartments within the strings 1116 and may fluidly contact one or more cathodes (i.e., positive electrodes) located at least partially within the cathode compartments. The cathodes may be made of or include any suitable cathode material including, for example, nickel, nickel oxyhydroxide (NiOOH), nickel hydroxide (Ni(OH)$_2$), sulfur composites, sulfur halides, including sulfuric chloride or lithium thionyl chloride, any of the positive electrode materials described in any of the patents or patent application publications cited in the present disclosure, and/or any other suitable positive electrode material.

In various embodiments, the catholyte flows through some or all of the strings 1116 in series with each other, in parallel with each other, or any combination thereof. In some embodiments, catholyte has a significantly lower electrical conductivity than the electrically conductive fluid and does not need to be kept physically and electrically separate when flowing through the strings 1116. Only a small current through the catholyte is expected (e.g., losses of less than one percent in some cases, which may vary depending on the orientation and arrangement of the strings 1116 and/or the catholyte flow path). However, it is contemplated that similar isolation measures could be taken for the catholyte if an electrically conductive catholyte were used.

Electrical Connections

Figure 13:
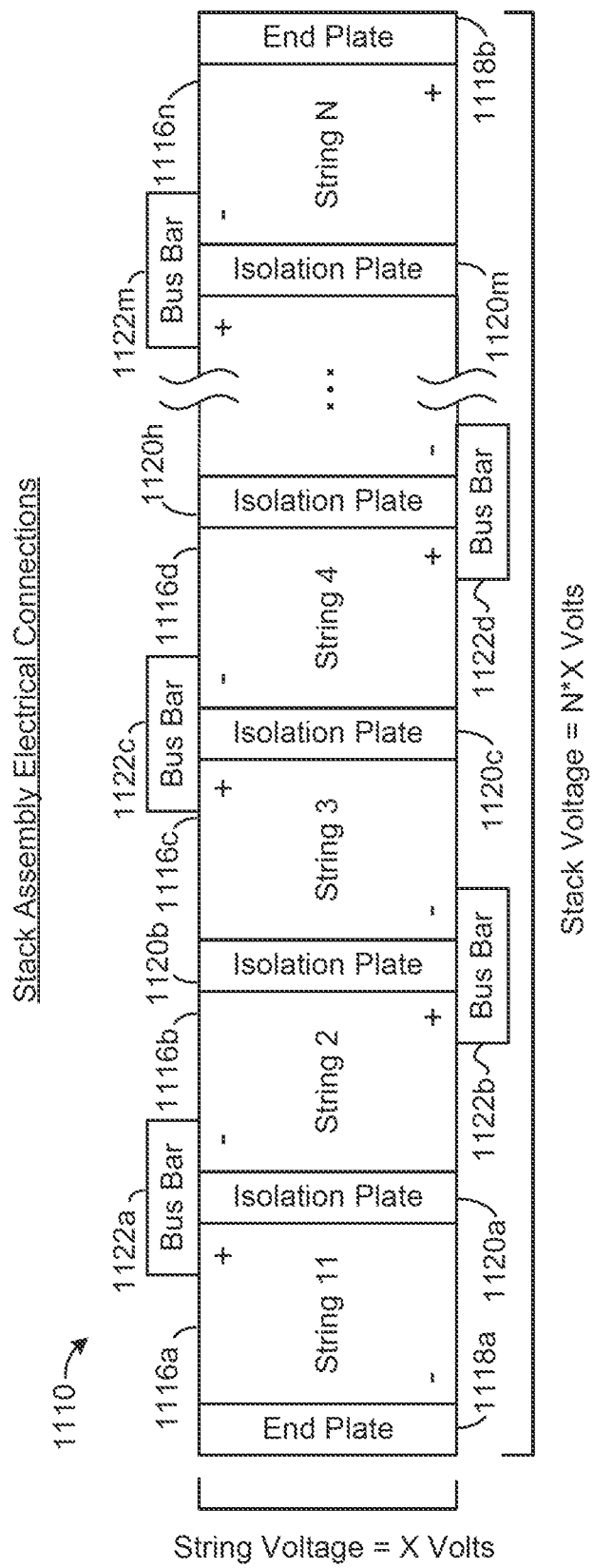
FIG. 13 is a schematic diagram of electrical connections within the system of FIG. 11, according to some embodiments.

Referring now to FIG. 13, a block diagram of electrical connections within the system 1100 is shown, according to some embodiments. FIG. 13 shows an example stack assembly 1110 with N strings 1116 (where N is a positive integer) between a first end plate 1118a and a second end plate 1118b, with the strings 1116 illustrated as String 1 1116a, String 2 1116b, String 3 1116c, String 4 1116d, up to String N 1116. Any positive integer value of N is possible in various embodiments. As illustrated, each string 1116 has a negative terminal (−) and a positive terminal (+). In some embodiments, each string 1116 is configured to provide a voltage differential across the string 1116, i.e., between the negative terminal (−) and the positive terminal (+). The voltage differential may be approximately 1.5 V in some implementations, and may have different magnitudes in various embodiments, uses, scenarios, etc. (e.g., X volts for each string 1116).

Isolation plates 1120 electrically isolate neighboring strings 1116 from one another. As shown, a first isolation plate 1120a electrically isolates String 1 1116a from String 2 1116*b*, a second isolation plate 1120*b* electrically isolates String 2 1116*b* from String 3 1116*c*, a third isolation plate 1120*c* electrically isolates String 3 1116*c* from String 4 1116*d*, a fourth isolation plate 1120*h* electrically isolates String 4 1116*d* from a subsequent string, an M$^{th}$ isolation plate 1120*m* isolates String N 1116*n* from preceding strings 1116 (M=N-1). The isolation plates 1120 thereby help prevent undesirable or unintended electric current flow (i.e., shunt current), voltage normalization, and/or other electrical interactions across the multiple strings 1116.

FIG. 13 shows bus bars 1122 connected to positive and negative terminals of neighboring strings 1116 to connect the strings 1116 in series. As shown, a first bus bar 1122*a* connects the positive terminal of String 1 1116*a* to the negative terminal of String 2 1116*b*, around isolation plate 1120*a* such that the only electrical connection between String 1 1116*a* and String 2 1116*b* is between the positive terminal of String 1 1116*a* and the negative terminal of String 2 1116*b*. A second bus bar 1122*b* connects the positive terminal of String 2 1116*b* to the negative terminal of String 3 1116*c*, around isolation plate 1120*b*, and so forth for bus bars 1122*c,d,h*, . . . ,*m* such that the strings 1116 are connected in series with the positive terminal of each string connected to the negative terminal of the subsequent string up to String N 1116*n*. For N strings 1116, the embodiment of FIG. 13 includes M=N-1 bus bars 1122.

When each of N strings 1116 provides a voltage differential of X volts (where X can be any value, e.g., 1.5 V, 3 V, 12 V, 24 V, etc.), due to the series arrangement shown in FIG. 13 the voltage differential across the N strings 1116 is approximately equal to N times X. The arrangement of strings 1116 shown in FIG. 13 thereby enables the stack assembly 1110 to provide or handle a voltage significantly larger than could be provided or handled by any individual string 1116, for example. As described in detail below, the electrical arrangement of FIG. 13 can be used to provide an alkali metal production mode (e.g., sodium production mode) and charging and discharging flow battery modes with the system 1100.

Flow Battery Mode

Figure 14:
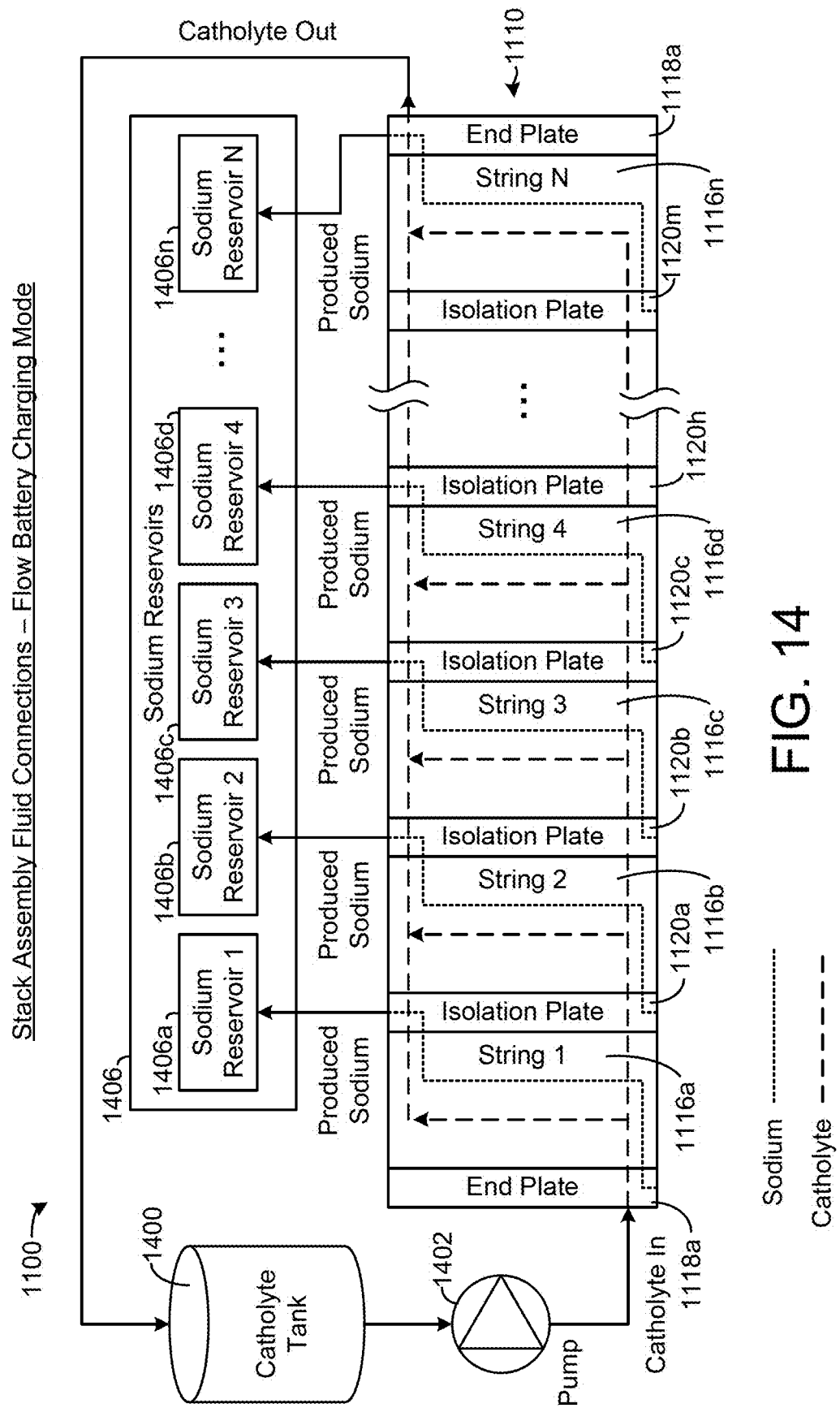
FIG. 14 is a diagram of fluid flows in the system of FIG. 11 in a flow battery charging mode, according to some embodiments.
Figure 15:
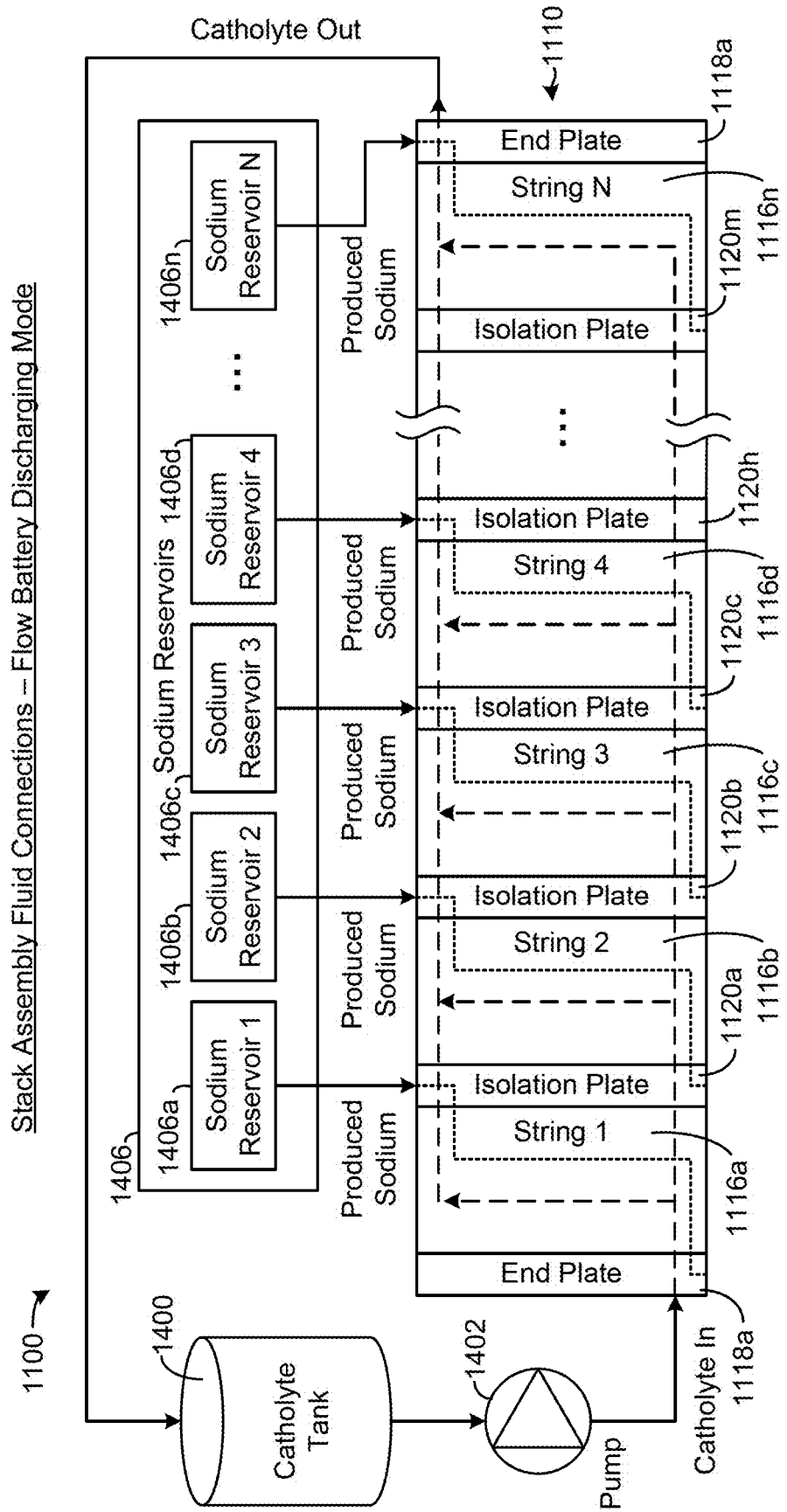
FIG. 15 is a diagram of fluid flows in the system of FIG. 11 in a flow battery discharging mode, according to some embodiments.

Referring now to FIGS. 14-15, fluid flows in the system 1100 in flow battery charging modes and discharging modes are shown, according to some embodiments. When operating in flow battery charging mode (FIG. 14), the system 1100 receives external electricity and converts the electricity into stored energy by producing and storing neutral sodium atoms (or some other similarly-reactive material, e.g., another alkali metal) by reducing positively charged cations (e.g., Na$^+$). When operating in flow battery discharging mode (FIG. 15), the system 1100 produces electricity through oxidation reactions that split electrons from the sodium atoms and transfer the sodium ions (Na$^+$) to a catholyte. These modes are achieved in part by providing flow of sodium and catholyte through different compartments and conduits of the stack assembly 1110, as described in further detail below.

The system 1100 may further include components providing circulation of a catholyte through the system 1100, for example a catholyte tank 1400, a pump 1402, and various tubing, conduits, etc. providing the flow pathways illustrated in FIG. 14. The catholyte tank 1400 is configured to hold a catholyte fluid, and may provide agitation (e.g., stirring, mixing) of the catholyte fluid in some embodiments. The catholyte fluid can include or be made up of molecules suitable for giving up an Na$^+$ ion during operation of the charging mode of FIG. 14 and to take on an Na$^+$ ion during operation of the discharging mode of FIG. 15, for example as described in U.S. Pat. No. 10,020,543, the entire disclosure of which is incorporated by reference herein. The pump 1402 operates to pump the catholyte from the catholyte tank 1400, through and across the strings 1116, and back to the catholyte tank 1400. The pump 1402 can be controlled to provide a constant flow rate of catholyte through the stack assembly 1110, for example. The catholyte tank 1400 stores or takes on excess or backup catholyte, for example enabling changes in total volume of the catholyte during charging and discharging operations.

The catholyte is shown flowing through pathways in the strings 1116. The pathways inside the strings 1116 are illustrated in more detail in FIGS. 17-18. The catholyte flow paths are continuous through the strings 1116, such that catholyte can flow through any of the strings 1116 as it circulates through the system 1100, driven by the pump 1402. The catholyte is preferably electrically insulating, such that it does not provide a path for an electric current to flow between the strings 1116 as the catholyte cycles through the system 1100.

The sodium reservoirs 1406 include separate reservoirs for each of the strings 1116, such that each of the sodium reservoirs 1406 receives sodium from one of the strings 1116 without mixing, contact between, etc. the sodium from the separate strings 1116. The sodium reservoirs 1406 may be coupled together, for example sharing walls made of one or more non-conductive and sodium-compatible materials (e.g., polymethylpentene (PMP), steel coated with an electrically insulating coating), for example in arrangement having a common headspace and different compartments defining the sodium reservoirs 1406. FIGS. 14-15 show Sodium Reservoir 1 1406*a* connected to String 1 1116*a*, Sodium Reservoir 2 1406*b* connected to String 2 1116*b*, Sodium Reservoir 3 1406*c* connected to String 3 1116*c*, Sodium Reservoir 4 1406*d* connected to String 4 1116*d*, through Sodium Reservoir N 1406*n* connected to String N 1116*n*. This arrangement electrically isolates the sodium from each string to prevent electric currents from flowing between the strings 1116 via the sodium, as may occur in other designs.

In flow battery charging mode (illustrated in FIG. 14), the system 1100 is first self-primed by the self-priming battery cells 100 which generate sodium in situ within the strings 1116. A voltage is applied across the stack assembly 1110 by an external voltage source. The applied voltage provides a voltage differential across each of the strings 1116. The pump 1402 operates to cycle catholyte through the strings 1116. The voltage differential across each of the strings 1116 causes a Na$^+$ cation to be pulled from the catholyte, through a membrane, and into an anode compartment where the Na$^+$ cation combines with an electron (provided by a current from the external voltage source) to produce a sodium atom. This reaction continues to produce sodium atoms in each string 1116, which causes an increase in volume of material in the sodium pathway in each string 1116 and thereby forces sodium out of the strings 1116 and into the respective sodium reservoirs 1406. Sodium atoms are thereby produced and stored in the sodium reservoirs 1406, causing the electricity to be stored in the form of electro-chemical energy.

In flow battery discharging mode (illustrated in FIG. 15), the system 1100 operates to output electricity. Sodium flows from the sodium reservoirs 1406 (e.g., from bottom draw ports or drip tubes) to the respective strings 1116 (e.g., drawn into the strings 1116 by gravity), where sodium atoms within the strings 1116 lose an electron and Na$^+$ cations flow across a membrane and into the catholyte, which continues to circulate by operation of pump 1402. The excess electron moves to a cathode and thereby produces electricity that can flow out of the system 1100. The system 1100 is thereby configured to produce electricity from stored sodium atoms when operating in flow battery discharging mode.

Sodium Production Mode

Figure 16:
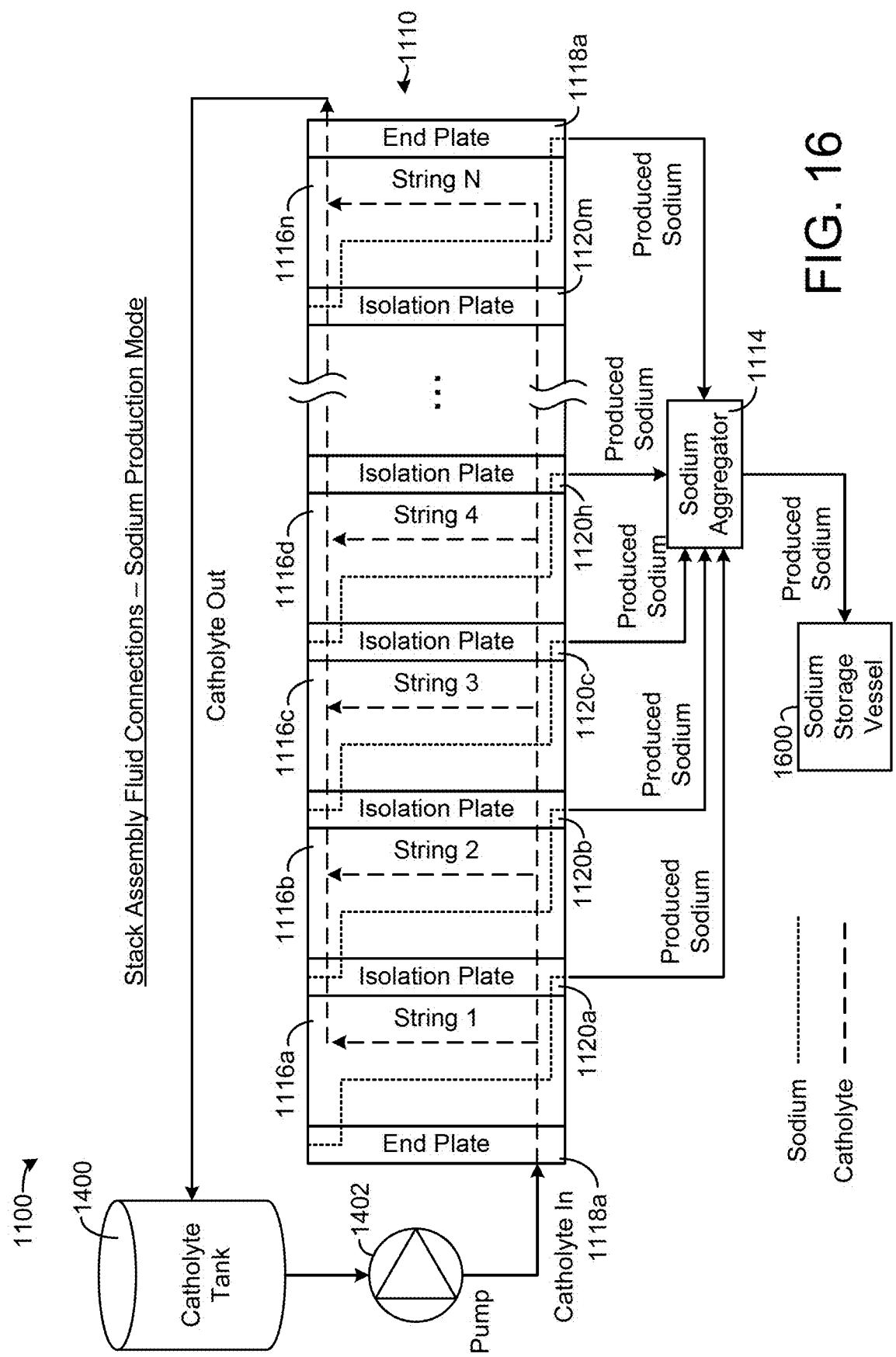
FIG. 16 is a diagram of fluid flows in the system of FIG. 11 in a sodium production mode, according to some embodiments.

Referring now to FIG. 16, fluid flows in the system 1100 in sodium production mode is shown, according to some embodiments. As in FIGS. 14-15, the self-priming battery cells 100 can operate to prime the sodium production mode by generating an initial amount of sodium in situ the strings 1116. In the sodium production mode, the system 1100 is arranged as shown in FIG. 16 and the sodium produced by the strings 1116 (via reactions as described more fully with reference to FIGS. 17-18) flows separately to the sodium aggregator 1114. The pump 1402 operates to cycle catholyte through the stack assembly 1110, including through the catholyte tank 1400. In some embodiments, the catholyte tank 1400 is a source of catholyte which provides sufficient catholyte for continuous operation of the system to produce sodium for an indefinite amount of time, e.g., by having a sufficiently large volume, by being refilled by an external source, etc.

The sodium aggregator 1114 is configured to aggregate the sodium from the separate strings 1116 into a single output to a sodium storage vessel 1600. The sodium storage vessel 1600 provides a single, unified space that receives sodium from all strings 1116 (e.g., in contrast to the separate sodium reservoirs 1406 of FIGS. 14-15). Sodium in the storage vessel 1600 can then be removed as a valuable substance for other uses. Advantageously (and as detailed below with reference to FIGS. 23-26, the sodium aggregator 1114 is configured to maintain electrical isolation between the sodium in each string 1116 while aggregating sodium output by each string into a single, intermingled volume in the sodium storage vessel 1600. By maintaining electrical isolation between the sodium in each string 1116, no current can flow between the strings 1116 through the sodium and the strings 1116 can be held at different voltages. The sodium aggregator 1114 thus plays an important role in enabling the series electrical connection between the strings 1116 illustrated in FIG. 13.

In sodium production mode, produced sodium is removed from the stack assembly 1110 via the sodium aggregator 1114 and is prevented from flowing back into the strings 1116 after production. This is a distinction relative to flow battery mode in which the produced sodium is permitted to flow back into the stack assembly 1110 in flow battery discharging mode of FIG. 15. In both sodium production mode and flow battery mode, the self-priming battery cells 100 operate to generate sodium in situ within the stack assembly 1110 during a priming stage (and, in some scenarios for maintenance purposes), but the self-priming features are no longer needed after the unit cells have been primed (e.g., filled) with sodium during runtime of the sodium production mode.

String Construction

Figure 17:
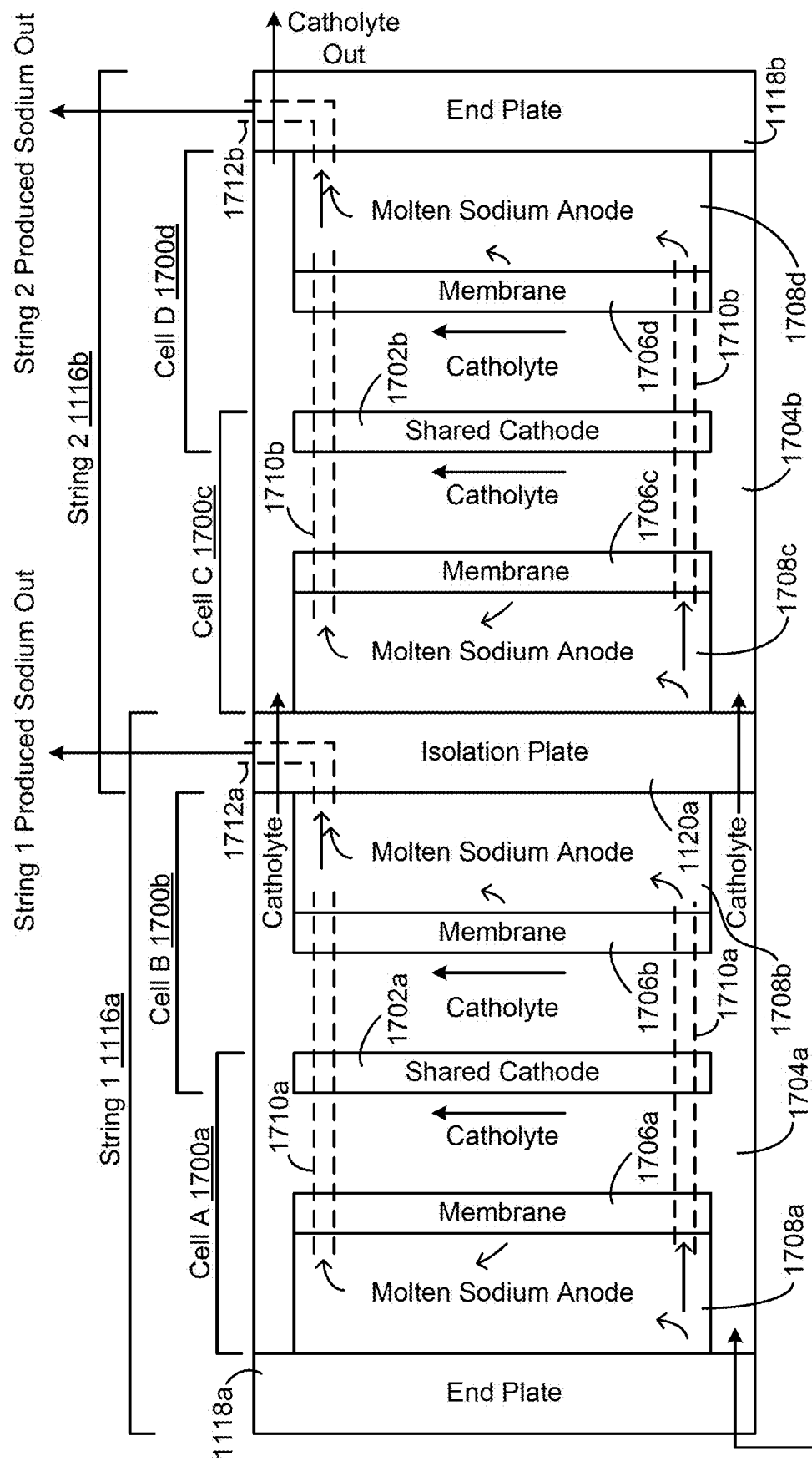
FIG. 17 is a diagram of fluid flows through cells of a string of the system of FIG. 11, according to some embodiments.

Referring now to FIG. 17, a diagram of example strings 1116 of the system 1100 is shown, according to some embodiments. In the example shown, each string 1116 has two cells, shown in FIG. 17 as Cell A 1700a and Cell B 1700b of String 1 1116a and Cell C 1700c and Cell D 1700d of Sting 2 1116b. Each cell 1700 can be characterized as a battery cell (i.e., a secondary cell, a unit cell, etc.). In each cell 1700, catholyte is provided on an opposite side of a membrane from molten sodium (or other anode materials in other embodiments), such that a voltage can be produced across each cell 1700 in a discharging mode or voltage across the cell 1700 can be used to produce sodium (or otherwise store energy) in a charging mode. The membranes in the embodiments herein are selective of sodium ions and may be NaSICON or beta-alumina materials.

As shown in FIG. 17, the Cell A 1700a and Cell B 1700b are arranged for parallel fluid flow therethrough and such that Cell A 1700a and Cell B 1700b share a cathode (shared cathode 1702a). That is, String 1 1116a includes a catholyte chamber 1704a through which catholyte can flow and which is filled with catholyte during operation of the system 1110. The catholyte chamber 1704a is divided by the shared cathode 1702a, such that catholyte can flow in parallel along two sides of the cathode 1702a. The catholyte chamber 1704a is bounded by a first membrane 1706a which separates the catholyte in the catholyte chamber 1704a from a first anode chamber 1708a of the string 1116a, and by a second membrane 1706b which separates the catholyte chamber 1704 a from a second anode chamber 1708b. The shared cathode 1702a is positioned approximately equidistantly between the first membrane 1706a and the second membrane 1706b such that catholyte can flow through regions of catholyte chamber 1704a between the first membrane 1706a and the shared cathode 1702a and between the second membrane 1706b and the shared cathode 1702a. Cell A 1700a is defined by the combination of the first anode chamber 1708a, the first membrane 1706a, a portion of the catholyte chamber 1704a, and the shared cathode 1702a, while Cell B 1700b is defined by the combination of the second anode chamber 1708b, the second membrane 1706b, a portion of the catholyte chamber 1704a, and the shared cathode 1702a. As such, the cathode 1702a is shared between the adjacent unit cells 1700a and 1700b within String 1 1116a.

String 1 1116a is also shown to include sodium conduits (e.g., tubes, pipes, etc.) 1710a that fluidly connect the first anode chamber 1708a with the second anode chamber 1708b. The sodium conduits 1710a allow sodium (or other anode material) to flow through and between the anode chambers 1708a-b of String 1 1116a and to an outlet 1712a positioned at the isolation plate 1120a. As illustrated in FIG. 17, both the sodium and the catholyte may flow in parallel through each string 1116, in the same direction, opposite directions, or any combination thereof.

String 2 1116b is shown as being arranged substantially the same as String 1 1116a, and includes corresponding components including a shared cathode 1702b, a catholyte chamber 1704b, a first membrane 1706c, a second membrane 1706d, a first anode chamber 1708c, a second anode chamber 1708d, conduits 1710b, and outlet 1712b. FIG. 17 illustrates that the catholyte chamber 1704a of String 1 1116a is in fluid communication with the catholyte chamber 1704b of String 2 1116b, such that catholyte can flow through the catholyte chamber 1704a of String 1 1116a into the catholyte chamber 1704b of String 2 1116b. FIG. 17 also illustrates that the anode chambers 1708a,b and conduits 1710a of String 1 are separate from (including electrically isolated from at least by the isolation plate 1120a) the anode chambers 1708c,d and conduits 1710b of String 2 1116b. Thus, catholyte is shared between String 1 1116a and String 2 1116b while the sodium (or other fluid anode) is kept isolated both electrically and fluidly from adjacent strings 1116.

Figure 18:
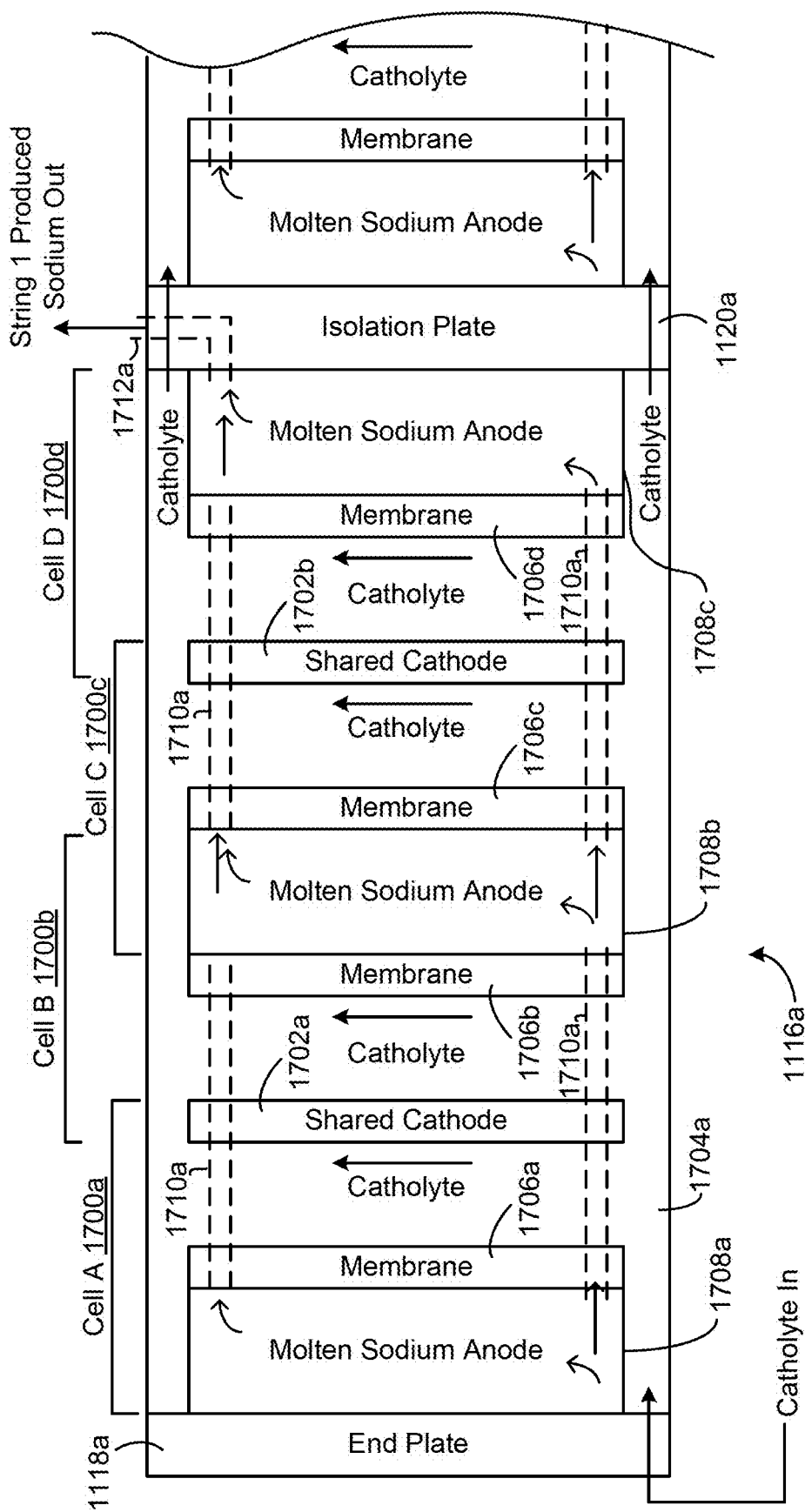
FIG. 18 is another diagram of fluid flows through cells of a string of the system of FIG. 11, according to some embodiments.

Referring now to FIG. 18, another view of strings 1116 of the system 1100 is shown, according to some embodiments. In the example shown in FIG. 18, each string 1116 includes four cells, shown as Cell A 1700a, Cell B 1700b, Cell C 1700c, and Cell D 1700d of String 1 1116a. As in the example of FIG. 17, Cell A 1700a and Cell B 1700b are made up of a first shared cathode 1702a portions of catholyte chamber 1704a, a first membrane 1706a, a second membrane 1706b, a first anode chamber 1708a, and a second anode chamber 1708b arranged as described with reference to FIG. 17.

In the example of FIG. 18, String 1 1116a is provided with additional cells (Cell C 1700c and Cell D 1700d) by using second anode chamber 1708b to provide a shared anode between Cell B 1700b and Cell C 1700c. As shown, the second anode chamber 1708b is delineated by the second membrane 1706b and by a third membrane 1706c. The third membrane 1706c separates the second anode chamber 1708b from a portion of the catholyte chamber 1704a between the third membrane 1706c and a second shared cathode 1702b. The shared cathode 1702b is an element of Cell C 1700c and Cell D 1700d. Cell D 1700d also includes a third anode chamber 1708c separated from the catholyte chamber 1704a by a fourth membrane 1706d such that catholyte can flow through the catholyte chamber 1704a between the fourth membrane 1706d and the second shared cathode 1702b. As shown, String 1 1116a thereby provides four cells using two cathodes and third anode chambers. Strings having any number of cells (e.g., 2, 3, 4, 5, 6, 7, 8, ect.) are within the scope of the present disclosure.

Sodium Distributor

Figure 20:
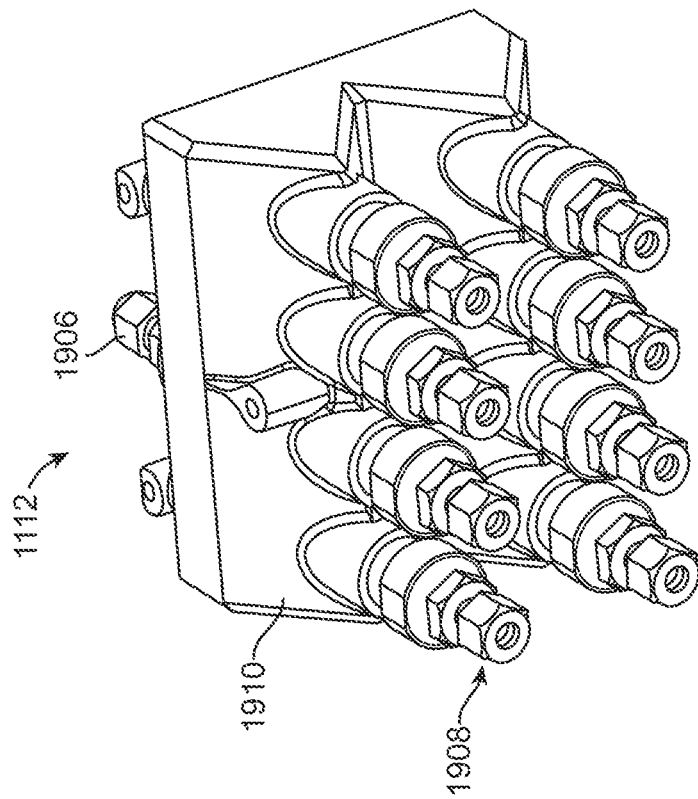
FIG. 20 is a second perspective view of the sodium distributor of FIG. 19, according to some embodiments.
Figure 19:
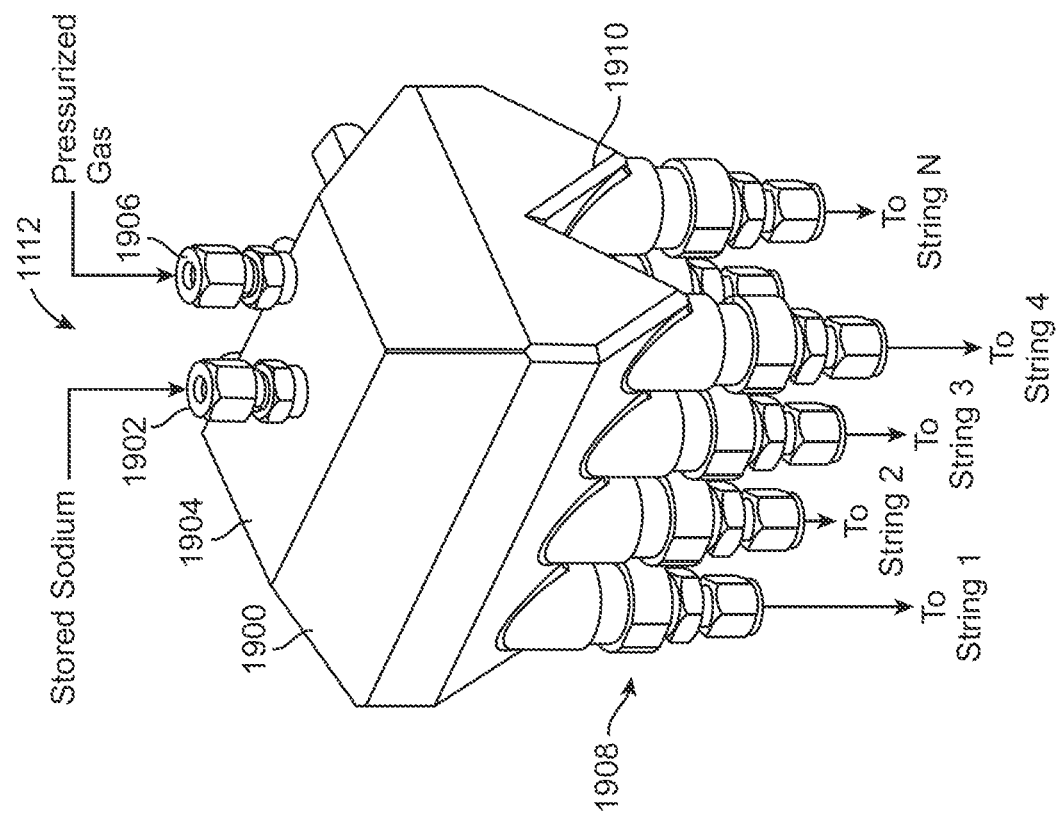
FIG. 19 is a first perspective view of a sodium distributor of the system of FIG. 11, according to some embodiments.
Figure 22:
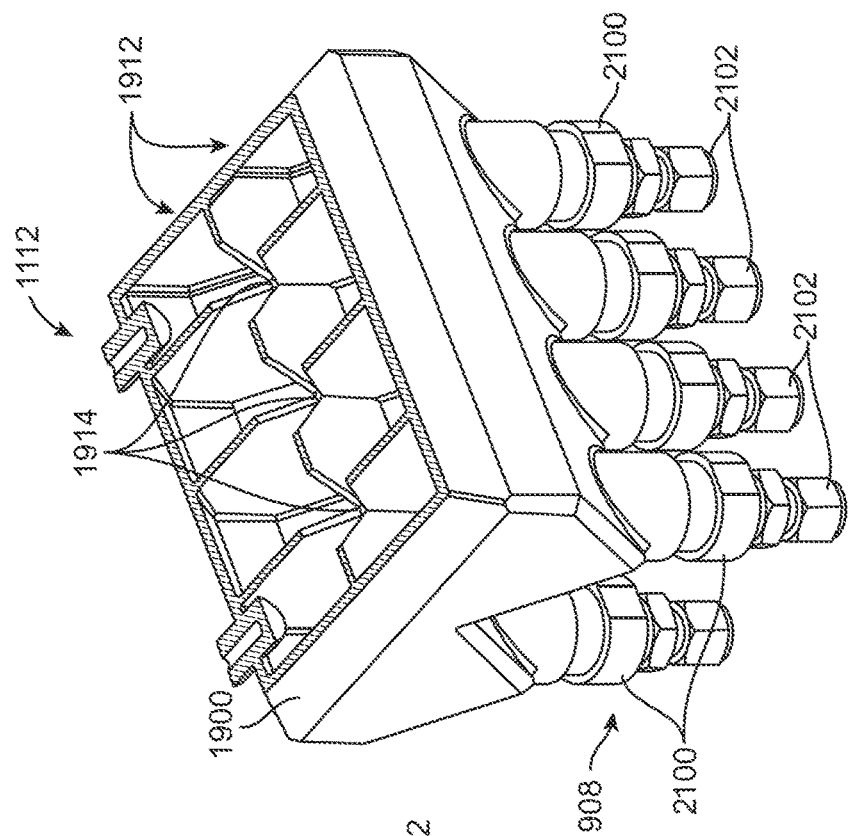
FIG. 22 is a second cut-away view of the sodium distributor of FIG. 19, according to some embodiments.
Figure 21:
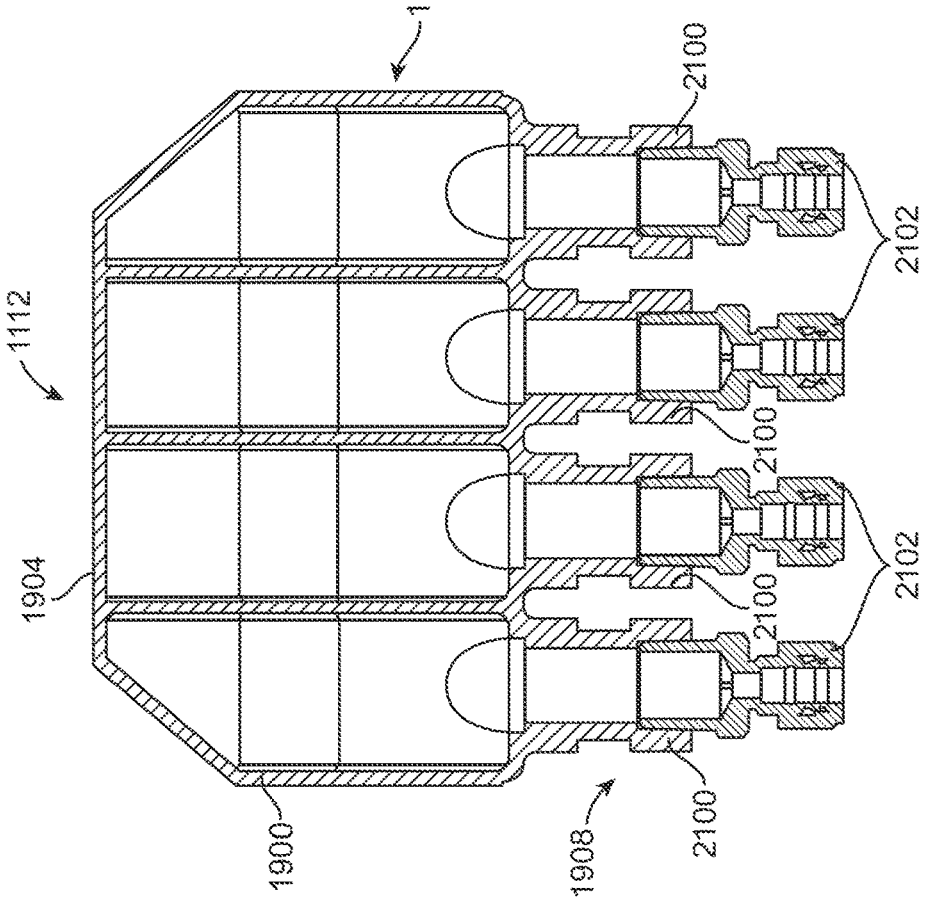
FIG. 21 is a first cut-away view of the sodium distributor of FIG. 19, according to some embodiments.
Figure 27:
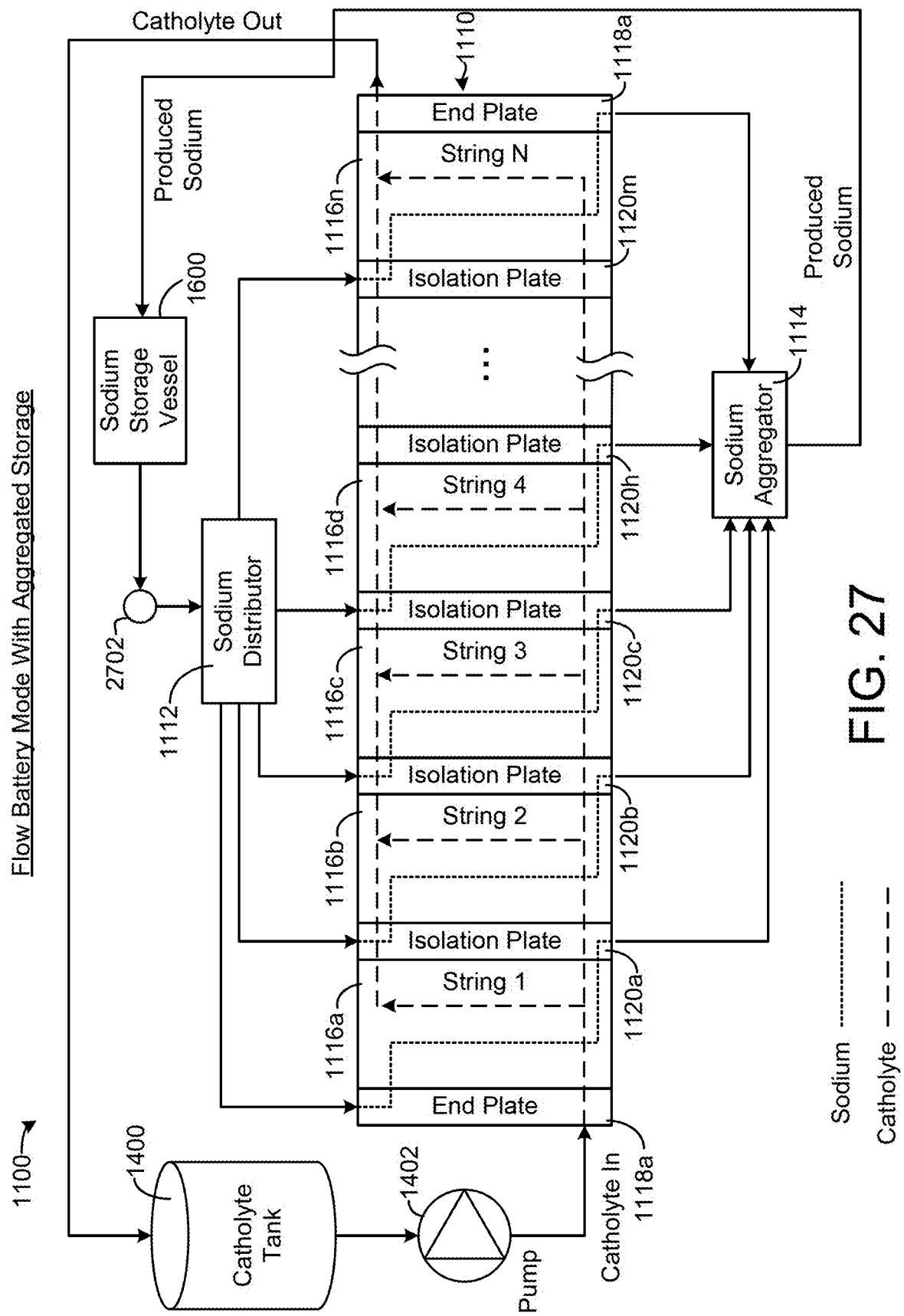
FIG. 27 is a diagram of fluid flows in the system of FIG. 11 in a first aggregated storage flow battery mode, according to some embodiments.

Referring now to FIGS. 19-22, various views of the distributor 1112 are shown, according to some embodiments. As noted above, the distributor 1112 can be used to prime the strings 1116 with an initial amount of sodium for embodiments of the system 1110 that do not include the self-priming battery cells 100. However, the distributor 1112 is not needed for this purpose for embodiments of the system 1100 that include the self-priming battery cells 100. The distributor 1112 can also be used to deliver stored (e.g., previously produced) sodium into the strings 1116 for embodiments that include an aggregated sodium storage vessel 1600 (as shown in FIG. 27) rather than string-specific sodium reservoirs 1406 (as shown in FIG. 14). The distributor 1112 is connectable in series between the sodium storage vessel 1600 and the strings 1116 of the system 1100 and configured to distribute the fluid sodium from the sodium storage vessel 1600 to the strings 1116 while preventing an electrical shunt current from flowing between the strings 1116 via the molten sodium. FIG. 19 shows a first perspective view of the distributor 1112, FIG. 20 shows a second perspective view of the distributor 1112, FIG. 21 shows a first cut-away view of the distributor 1112, and FIG. 22 shows a second cut-away view of the distributor 1112.

As shown in FIGS. 19-22, the distributor 1112 includes a chamber 1900, a sodium inlet 1902 positioned at a top wall 1904 of the chamber 1900, a gas inlet 1906 positioned at a top wall 1904 of the chamber 1900, and multiple outlets 1908 extending from a bottom wall 1910 of the chamber 1900 such the chamber 1900 is arranged between the sodium inlet 1902 and the multiple outlets 1908. The chamber 1900 is airtight, such that fluid can only enter or exit the interior of the chamber 1900 via the sodium inlet 1902, the gas inlet 1906, and the outlets 1908. The gas inlet 1906 is connectable to a source of an inert gas that will not react with sodium and allows the inert gas to be provided into the chamber 1900 (e.g., at a pressure higher than atmospheric pressure) to fill any space in the chamber 1900 not occupied by sodium with a substance that will not react with the sodium. The chamber 1900 may be made of a non-conductive material. The sodium inlet 1902 is connectable to the aggregated sodium storage vessel 1600 (shown in FIG. 27) and is configured to introduce sodium from the aggregated atmospheric pressure) to fill any space in the chamber 1900 not occupied by sodium with a substance that will not react with the sodium. The chamber 1900 may be made of a non-conductive material. The sodium inlet 1902 is connectable to the aggregated sodium storage vessel 1600 (shown in FIG. 27) and is configured to introduce sodium from the aggregated sodium storage vessel 1600 into the interior of the chamber 1900. The sodium inlet 1902 may regulate the rate of sodium flow or drip into the chamber 1900. The sodium inlet 1902 is shown as substantially centrally located on the top surface 1904 of the chamber 1900.

Each outlet 1908 is shown as having a tubular or nozzle shape extending from the bottom surface 1910 of the chamber 1900. The outlets 1908 may be made of an electrically insulating material. Each outlet 1908 may be fluidly connected to a corresponding string 1116 via the tubing 1124 and configured to deliver sodium from distributor 1112 to the corresponding string 1116. As shown in FIGS. 19-22, the outlets 1908 are arranged in two symmetric rows of four (eight total outlets 1908), but other numbers of outlets 1908 or other arrangements are also possible. The number of outlets 1908 matches the number of strings 1116 served by the distributor 1112. Each outlet 1908 may include a fitting 2100 made of an electrically insulating sodium-compatible material or other material (e.g., polytetrafluoroethylene (PTFE)) which electrically insulates the chamber 1900 from a tip 2102 of each outlet 1908. Accordingly, even if the tubes connecting the tips 2102 of each outlet 1908 to the stack assembly 1110 are exposed to different voltage levels, the electrical insulation provided by the fittings 2100 ensures that significant electric current does not flow between the strings 1116 via the structure of the distributor 1112.

In some embodiments, each outlet 1908 includes a valve, flow restrictor, narrow region, nozzle, flared nozzle, drip-forming device, etc. such that fluid drips through an air gap between the chamber 1900 and the tip 2102 of each outlet 1908. The air gaps may provide electrical shunt breaks within the outlets 1908 (i.e., between the chamber 1900 and the tips 2102) to disrupt electrical shunt current from flowing between the strings 1116 via the distributor 1112. In some embodiments, the pressure of the pressurized gas provided to the distributor 1112 via the gas inlet 1906 can be controlled (e.g., adjusted, regulated, modulated, etc.) to facilitate the formation of droplets of the electrically conductive fluid at orifices that connect the chamber 1900 to the outlets 1908. For example, a controller can measure or calculate the pressure differential across the orifices and adjust the pressure of the pressurized gas provided via the gas inlet 1906 (e.g., by operating a pump or other pressure control device) to maintain the pressure differential at a setpoint or target level that promotes droplet formation.

The chamber 1900 includes multiple compartments 1912, with each compartment 1912 corresponding to and aligned with one of the outlets 1908. The compartments 1912 are defined by dividing walls that extend part way from the bottom wall 1910 of the chamber 1900 toward the top wall 1904 of the chamber 1900, leaving space between the top wall 1904 of the chamber 1900 and the compartments 1912. The compartments 1912 are electrically isolated (e.g., due to a material composition of the dividing walls) from one another, such that current will not flow between fluid in separate compartments 1912 (when the fluid level is below the height of the compartments 1912). For example, the chamber 1900, the compartments 1912, etc. may be made of a non-conductive material that is compatible or non-reactive with sodium (e.g., PMP). As seen in FIG. 22, the compartments 1912 are connected by spill-over regions 1914 at which a height of the compartments 1912 is partially decreased at a shared corner of multiple compartments 1912. The spill-over regions 1914 facilitate distribution of fluid between the compartments 1912 when the fluid level in the chamber 1110 is above the spill-over regions 1914. By providing a common headspace above the compartments 1912 and in the chamber 1900, a constant pressure can be regulated across the compartments 1912 (e.g., by introduction of pressurized gas through the gas inlet 1906) which can advantageously cause distribution out of the distributor 1112 at constant drip rate or droplet size, in some embodiments. In some embodiments, the spill-over regions 1914 may be replaced with a distributor plate located above the compartments 1912 (e.g., within the common headspace) to equally distribute the fluid across the compartments 1912. The distributor plate may be structured similar to distillation column trays (e.g., a planar surface with many small orifices distributed across the planar surface) such that the fluid pools above the distributor plate and flows (e.g., drips, streams, etc.) substantially evenly through the orifices into the compartments 1912 located below.

Sodium Aggregator

Figure 24:
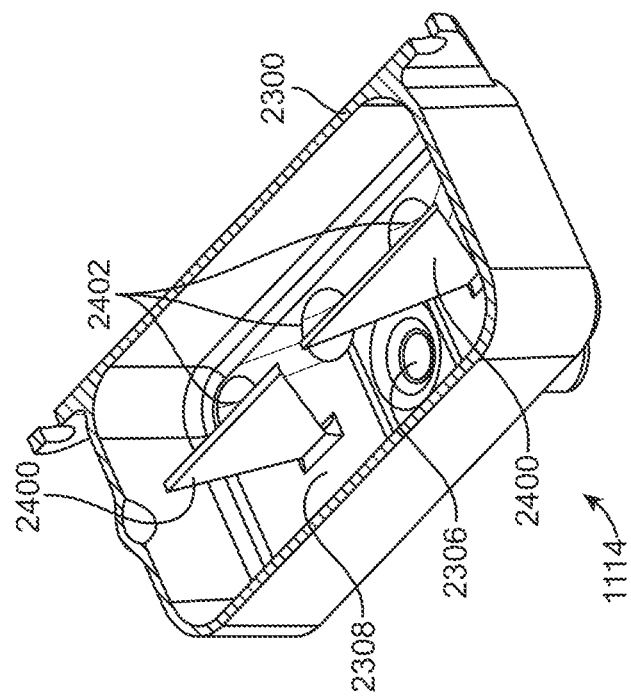
FIG. 24 is a first cut-away view of the sodium aggregator of FIG. 23, according to some embodiments.
Figure 23:
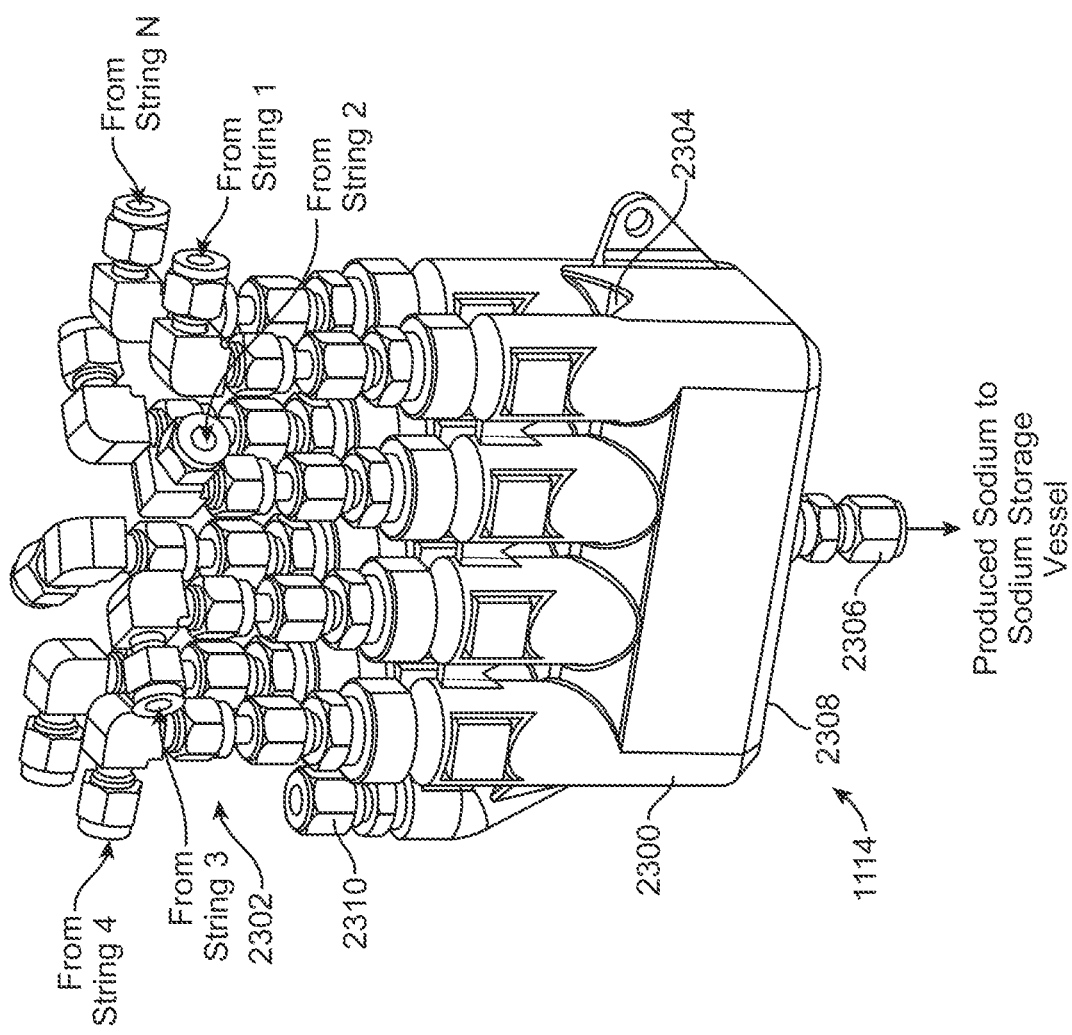
FIG. 23 is a perspective view of a sodium aggregator of the system of FIG. 11, according to some embodiments.
Figure 25:
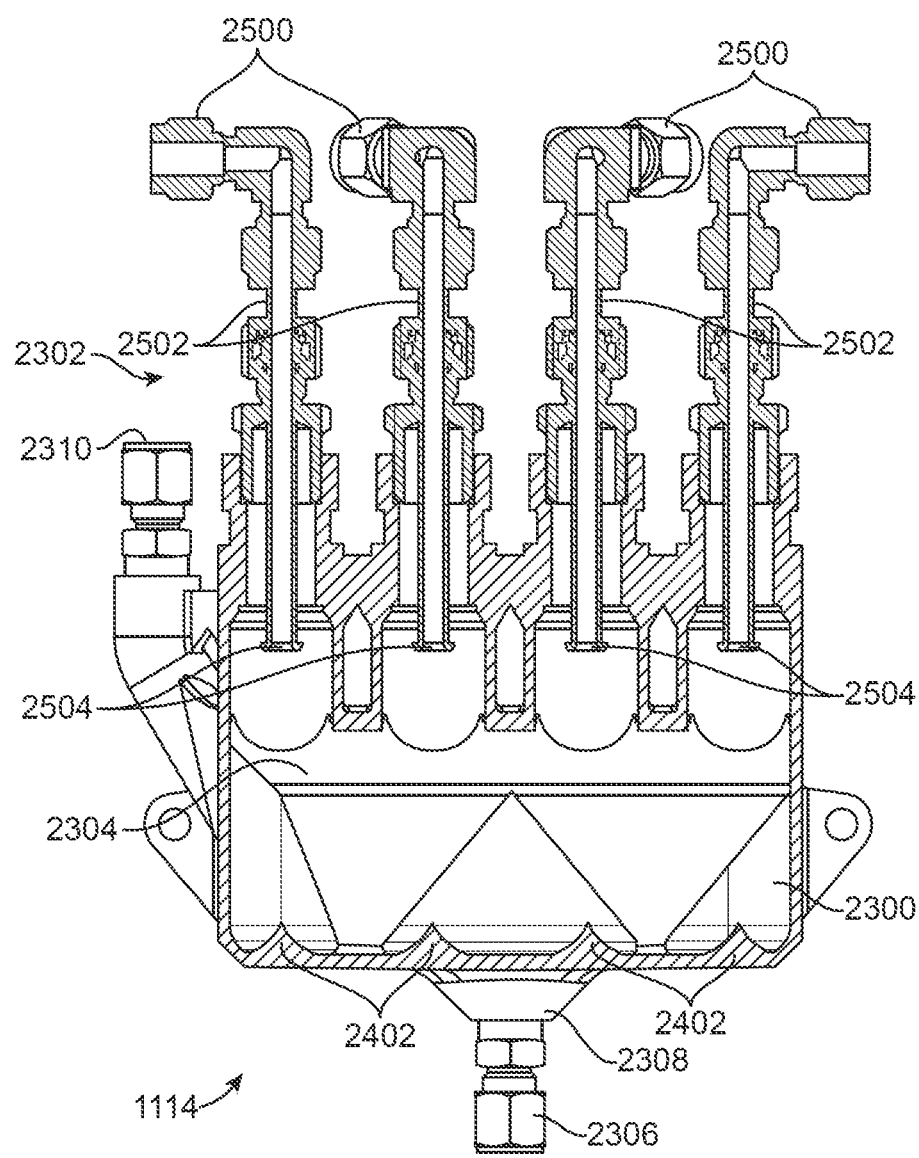
FIG. 25 is a second cut-away view of the sodium aggregator of FIG. 23, according to some embodiments.

Referring now to FIGS. 23-25, multiple views of the aggregator 1114 are shown, according to some embodiments. The aggregator 1114 can be fluidly connected in series between the strings 1116 and the sodium storage vessel 1600 (as shown in FIG. 16) and configured to deliver fluid sodium from the strings 1116 to the sodium storage vessel 1600 while preventing electrical shunt current from flowing between strings 1116 via the fluid sodium. FIG. 23 shows a first perspective view, FIG. 24 shows a first cut-away view, and FIG. 25 shows a second cut-away view.

The aggregator 1114 is shown as including a chamber 2300 and multiple inlets 2302 extending upwardly from a top wall 2304 of the chamber 2300. The aggregator 1114 also includes an outlet 2306 extending downwardly from a bottom wall 2308 of the chamber 2300, such that the chamber 2300 is between the inlets 2302 and the outlet 2306. The aggregator 1114 also includes a gas inlet 2310 connected to the chamber 2300 and allowing introduction of an inert gas into the chamber 2300.

The outlet 2306 is shown as centrally located on the bottom wall 2308 of the chamber 2300, with the bottom wall 2308 sloped toward the outlet 2306 such that gravity pulls fluid in the chamber 2300 toward and into the outlet 2306. The bottom wall 2308 is also shown as including splash-prevention members 2402 (e.g., ridges, slopes, projections, etc.) arranged relative to the inlets 2302 to reduce or eliminate splashing of fluid that drips from the inlets 2302 into the chamber 2300. The chamber 2300 is shown as including internal support struts 2400 extending from the bottom wall 2308 to the top wall 2304 for structural support.

Each inlet 2302 includes a horizontal tip 2500 and a vertical conduit 2502. The horizontal tips 2500 receive fluid sodium from the strings 1116, which then slowly moves to the vertical conduits 2502. The vertical conduits 2502 are configured such that the sodium drips down through the vertical conduits 2502 and out terminals 2504 located at the bottom of each vertical conduit 2502. The inlets 2302 thereby cause droplets of fluid sodium to fall from the terminals 2504 into the chamber 2300 for example onto the splash-prevention members 2402, through the volume of the chamber 2300 (e.g., through the inert gas provided via gas inlet 2310). In some embodiments, the pressure of the inert gas provided to the aggregator 1114 via the gas inlet 2310 can be controlled (e.g., adjusted, regulated, modulated, etc.) to facilitate the formation of droplets of the fluid sodium at the terminals 2504. For example, a controller can measure or calculate the pressure differential across the terminals 2504 and adjust the pressure of the pressurized gas provided via the gas inlet 2310 (e.g., by operating a pump or other pressure control device) to maintain the pressure differential at a setpoint or target level that promotes droplet formation. The inlets 2302 may include electrically isolating materials, fittings, etc. to electrically decouple the horizontal tips 2500 from the chamber 2300.

Because the fluid enters the chamber 2300 as droplets falling through an inert gas (e.g., a non-conductive gas) or other electrically insulating fluid, the fluid does not provide a conductive path back from the interior of the chamber 2300 to the strings 1116 or vice versa. Additionally, even when droplets are falling from multiple inlets 2302 simultaneously, the droplets are electrically isolated from one another such that no electrical connection is created between different inlets 2302. The aggregator 1114 thus aggregates fluid sodium at the outlet 2306 of the aggregator 1114 while preventing electrical communication between the different strings 1116 or, in various embodiments, any various fluid sources providing conductive fluid to the multiple inlets 2302.

Sodium Manifold

Figure 26:
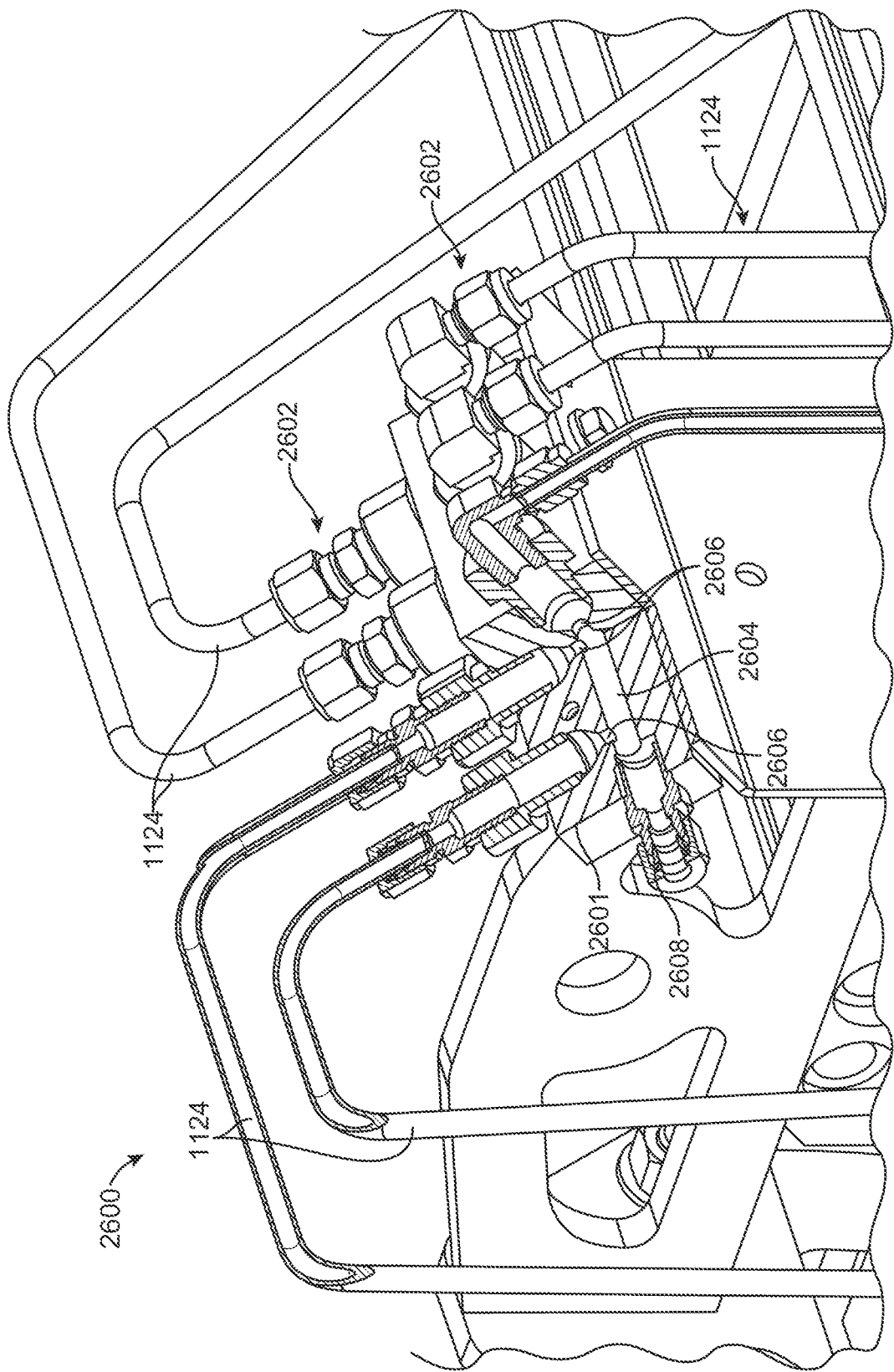
FIG. 26 is a cut-away perspective view of a distributor that can be used with the system of FIG. 11, according to some embodiments.

Referring now to FIG. 26, a cut-away perspective view of a manifold 2600 that can be used with the system 1100 is shown, according to some embodiments. The manifold 2600 can be used in place of the distributor 1112 as illustrated in FIGS. 11-12 and 19-22 and/or the aggregator 1114 as illustrated in FIGS. 11-12 and 23-25 in any of the embodiments described herein. The manifold 2600 can be configured to distribute fluid to multiple strings 1116 from a common source without creating electrical connections between the strings 1116 while a voltage is provided across the stack assembly 1110. The manifold 2600 can be configured to aggregate fluid received from multiple strings 1116 and provide the aggregated fluid to a common source without creating electrical connections between the strings 1116 while a voltage is provided across the stack assembly 1110. In some embodiments, the manifold 2600 does not keep the strings 1116 electrically isolated from each other but can still be used to prime the strings 1116 during a startup phase of system operation and/or purge the strings 1116 during a shutdown phase of system operation when an electrical shunt break is not required. Alternatively, the manifold 2600 can be configured to keep the strings 1116 electrically isolated from each other by preventing electrical current from flowing between the strings 1116 via the electrically conductive fluid within the manifold 2600 and/or via the physical structure of the manifold 2600, as described below.

The manifold 2600 includes a body 2601 and multiple nozzles 2602 extending from the body 2601 (e.g., eight nozzles 2602). The nozzles 2602 are connected to tubing 1124, such that each nozzle 2602 is fluidly communicable with one string 1116 (similar to the depiction of FIGS. 11-12), for example with each nozzle 2602 connected to one tube or pipe as shown in FIG. 26. In some embodiments, the manifold 2600 can create electrical shunt breaks (e.g., air gaps, gaps of an electrically insulating fluid, etc.) that break up the streams of the electrically conductive fluid by forcing the electrically conductive fluid within the manifold 2600 to break into individual droplets or other non-continuous fluid streams when passing through the nozzles 2602. The nozzles 2602 can be oriented in a "V" shape as shown in FIG. 26 or alternatively could be oriented vertically to allow droplets of the electrically conductive fluid to drip vertically through the air gaps. In some embodiments, the nozzles 2602 are made of an electrically insulating material to prevent electric current from flowing between separate strings 1116 through the physical structure of the manifold 2600, similar to the distributor 1112 and/or the aggregator 1114 as previously described.

The body 2601 includes a central conduit (bore, channel, passage, opening, etc.) 2604. The central conduit 2604 is arranged to align with internal tips 2606 of the nozzles 2602. The central conduit 2604 is communicable with a port 2608 which can be connected to source of and/or receptacle for sodium (e.g., sodium storage vessel 1600), for example via tubing (tube, pipe, etc.). Sodium can thus flow to or from nozzles 2602 via the central conduit 2604 and internal tips 2606.

The manifold 2600 can facilitate priming of the system 1100 by distributing sodium received at the port 2608 substantially evenly to the multiple nozzles 2602. In such scenarios, sodium flows in through the port 2608 and along the central conduit 2604 to the internal tips 2606, where the sodium enters the nozzles 2602. Pressure/flow of the sodium can push the sodium upwards through the nozzles 2602 and into the tubing 1124. A small orifice in each nozzle 2602 can be included to provide back pressure that ensures flow into all of the nozzles 2602. The internal tips 2606, nozzles 2602, central conduit 2604, etc. can also be sized to create a choked flow effect that ensures substantially even flow to each of the nozzles 2602. Alternatively, the system 1100 can be self-primed by the self-priming battery cells 100 as described above. At the end of a priming stage, sodium stops flowing to or into the central conduit 2604 via the port 2608 (e.g., due to an end to operation of a pump driving sodium from an external source, etc.). Sodium can then run downwardly from the nozzles 2602 and into the central conduit 2604 via the internal tips 2606.

In some embodiments, the manifold 2600 can also facilitate aggregation of sodium from the strings 1116 at the conduit 2604. For example, sodium may flow to the nozzles 2602 via the tubing 1124 at a rate at which droplets of sodium are formed at an outer orifice of the inner tips 2606 proximate the central conduit 2604 and then drip (separately and through an air gap, for example) into the central conduit 2604. Alternatively or additionally, the nozzles 2602 may cause droplets of sodium to form proximate the tubing 1124 (e.g., at reduced diameter portions of the nozzles 2602 connected to the tubing 1124) and then drip through air gaps within the nozzles 2602 between the tubing 1124 and the inner tips 2606. The sodium may then flow through the inner tips 2606 and into the central conduit 2604. The nozzles 2602 may thereby be configured to provide aggregation of sodium from the tubing 1124 at the central conduit 2604 while maintaining electrical disconnection between the sodium in different strings 1116 (and different sections of tubing 1124).

In some embodiments, the manifold 2600 can distribute sodium to the strings 1116 from the sodium storage vessel 1600 when operating in flow battery discharging mode (i.e., when consuming sodium to produce electricity). It is contemplated that the manifold 2600 can be used or modified to provide electrical isolation between the strings 1116 in flow battery discharging mode, for example, by creating electrical shunt breaks within the nozzles 2602. In some embodiments, the nozzles 2602 have an inverted "V" shape similar to the subset of the nozzles 2602 in the foreground of FIG. 26 with each nozzle 2602 having a pair of legs that extend downward from a center point at the middle of the inverted "V" shape. The end of each leg of the nozzles 2602 may include a flow restrictor such as an orifice (e.g., similar to the internal tips 2606) having a smaller diameter than the conduit that passes through the nozzles 2602. Such a configuration may cause the sodium to pool within the nozzles 2602 and form droplets at the flow restrictors when exiting the nozzles 2602 in either direction. The droplets may drip from the flow restrictors through air gaps below the flow restrictors, thereby providing a dual-direction shunt break.

In some embodiments, the system 1100 can be configured to control (e.g., adjust, regulate, modulate, etc.) the pressure of the fluid sodium within the nozzles 2602 and/or within the central conduit 2604 to facilitate the formation of droplets of the fluid sodium at the flow restrictors or other orifices within the manifold 2600. For example, a controller can measure or calculate the pressure differential across the flow restrictors and adjust the pressure of the fluid sodium within the central conduit 2604 (e.g., by providing a pressurized gas to the central conduit 2604, similar to the configuration of the distributor 1112 and the aggregator previously described). The controller can operate a pump or other pressure control device for the sodium and/or the pressurized gas to maintain the pressure differential at a setpoint or target level that promotes droplet formation within the manifold 2600 at one or both ends of the nozzles 2602.

Flow Battery Mode with Aggregated Storage

Referring now to FIG. 27, an illustration of the system 1100 arranged in a flow battery mode with aggregated storage is shown, according to some embodiments. Sodium produced during a charging mode flows out of the stack assembly 1110 to a sodium aggregator 1114, which aggregates the sodium in a sodium storage vessel 1600 as described in more detail with reference to FIG. 16. As shown in FIG. 27, the sodium storage vessel 1600 is connected back to the stack assembly 1110 via the sodium distributor 1112 such that the produced sodium can flow back into the strings 1116 of the stack assembly 1110 during a discharging mode. The produced sodium from the sodium storage vessel 1600 can thereby loop back into the stack assembly 1110 to provide discharge of stored energy from the sodium.

Although the sodium distributor 1112 and the sodium aggregator 1114 are shown in FIG. 27, it is contemplated that one or both of these components can be swapped out for the sodium manifold 2600. In some embodiments, the distributor 1112 can be implemented as an inverted version of the aggregator 1114 shown in FIGS. 11-12 and 23-25. Additionally, it is contemplated that the sodium distributor 1112 or the aggregator 1114 can be omitted from the configuration shown in FIG. 27 to provide a version of the system 1100 that operates in charging mode only (i.e., by omitting the distributor 1112) or a system that operates in discharging mode only (i.e., by omitting the aggregator 1114). Examples of systems that specialize in charging or discharging are described in greater detail with reference to FIG. 29. These and other modifications can be made not just in the embodiment shown in FIG. 27 but also for any of the other embodiments described herein.

In operation, the distributor 1112 is configured to disaggregate (e.g., distribute, split up, etc.) the sodium stored in sodium storage vessel 1600 into separate streams of sodium provided to the separate strings 1116. To enable voltage steps at each string 1116, the distributor 1112 provides electrical isolation between the separate streams of sodium provided to the separate strings 1116. As with other embodiments, the distributor 1112 may be a sodium distribution drip feeder configured to release droplets of molten sodium metal from an upper portion of the distributor 1112 such that the droplets of molten sodium metal fall through an electrically insulating fluid (e.g., inert gas) within the distributor 1112 into a plurality of electrically isolated compartments located along a lower portion of the distributor 1112 and connected to separate tubing running to the multiple strings 1116.

As shown in FIG. 27, a valve 2702 is arranged along a flow path of sodium and is operable to control the flow of sodium from the sodium storage vessel 1600 into the sodium distributor 1112. In some embodiments, valve 2702 may also have an off position in which the sodium storage vessel 1600 is not fluidly connected to the sodium distributor 1112. It is contemplated that the valve 2702 may also be capable of electrically insulating the sodium distributor 1112 and the sodium storage vessel 1600 from each other to further provide the electrical shunt break (i.e., disruption of unwanted electric current) in system 1100.

Figure 28:
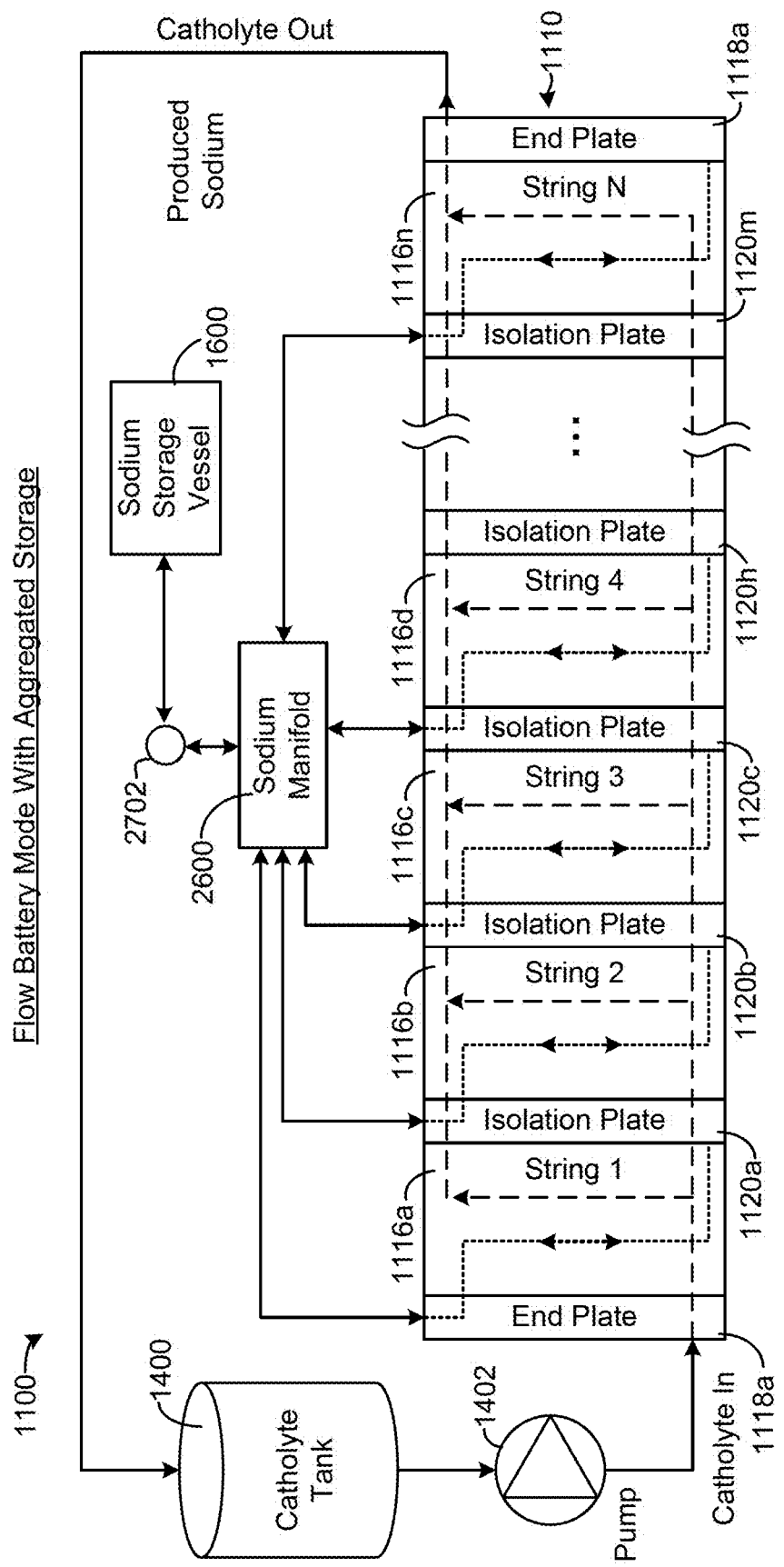
FIG. 28 is a diagram of fluid flows in the system of FIG. 11 in a second aggregated storage flow battery mode, according to some embodiments.

Referring now to FIG. 28, an illustration of another implementation of the system 1100 providing a flow battery mode is shown, according to some examples. In the example of FIG. 28, the sodium manifold 2600 is shown and is capable of providing both aggregation of sodium produced by the strings 1116 (for provision into the sodium storage vessel 1600) and distribution or disaggregation of sodium from the sodium storage vessel 1600. As described above, the manifold 2600 can perform the function of the distributor 1112 as shown in FIGS. 19-22 and/or the aggregator 1114 as shown in FIGS. 23-25 depending on the direction of the sodium flow through the manifold 2600. As such, the manifold 2600 is a versatile component capable of providing a dual-direction shunt break between the strings 1116.

In the example of FIG. 28, the strings 1116 can first be primed by generating sodium in situ within the strings 1116 using the self-priming battery cells 100 as previously described. After self-priming the strings 1116, the system 1100 can be operated in a charging mode or sodium production mode where the sodium is produced in the strings 1116 and flows to the manifold 2600. The manifold 2600 aggregates the sodium from the separate strings 1116 for storage in the sodium storage vessel 1600 while maintaining electrical isolation between the sodium in the separate strings 1116. Produced sodium is thereby stored in the sodium storage vessel 1600.

The system 1100 can also be operated in a discharging mode, where sodium from the sodium storage vessel flows (e.g., drips) back through the manifold 2600 to the multiple strings 1116. The manifold 2600 can distribute the sodium substantially evenly to the strings 1116 while maintaining electrical isolation between the strings 1116 (e.g., by dripping sodium through air gaps as described elsewhere herein). Sodium thereby reaches the strings 1116, where it is consumed in an electro-chemical reaction within strings 1116 that generate electricity provided as an output from the stack assembly 1110. As the strings 1116 empty of sodium while operating in the discharging mode, more space may become available within the strings 1116. The sodium manifold 1116 and/or the sodium storage vessel 1600 may be positioned physically above the strings 1116 such that gravity causes downward flow of sodium into the strings and a powered pump is not required to deliver sodium to the strings 1116. In the example of FIG. 28, each string 1116 includes one open sodium port through which sodium both enters and exits the string 1116 depending on operating mode. The other sodium ports used in other embodiments can be sealed or closed as they are not needed in this configuration.

Geographically Distributed Charging and Discharging

Figure 29:
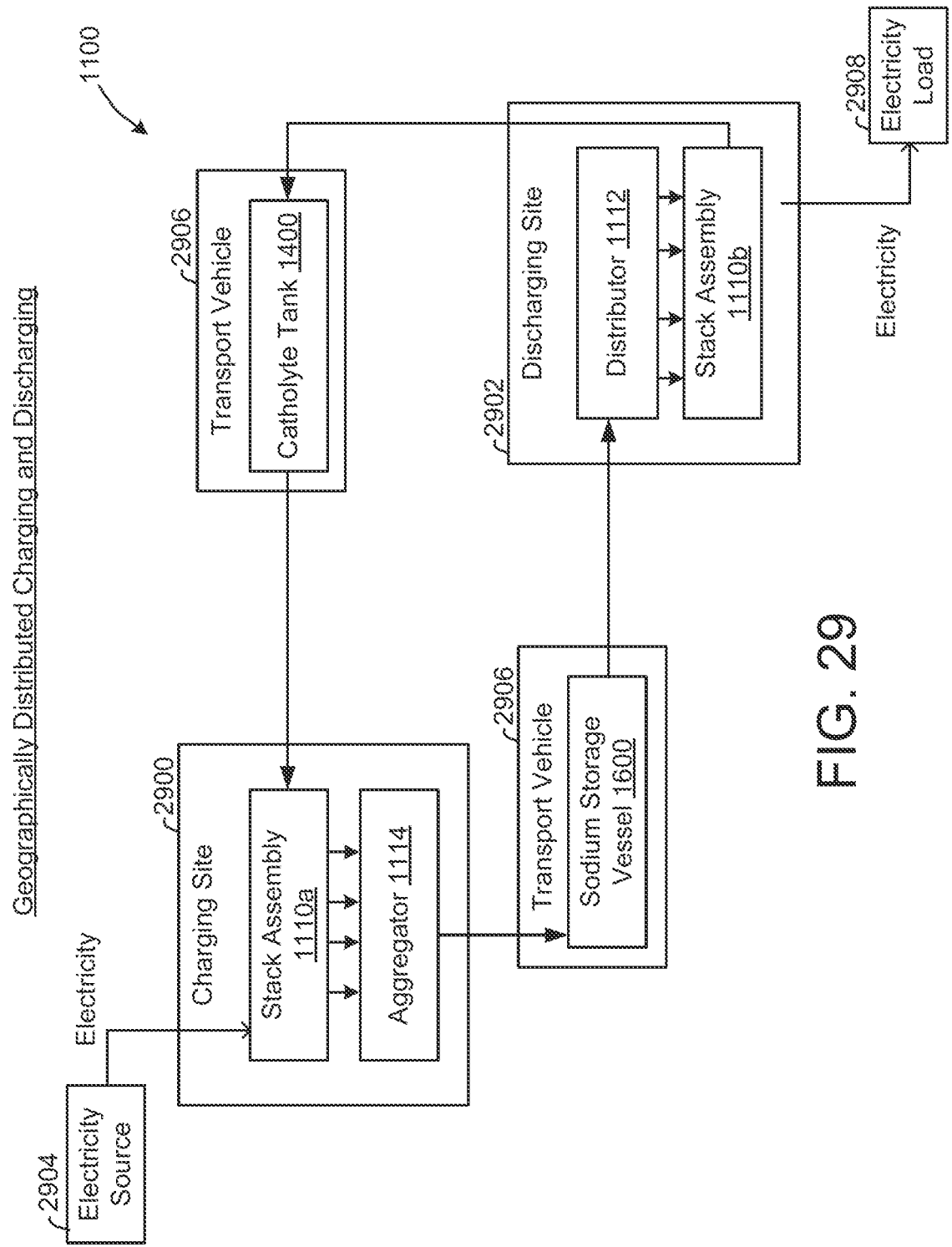
FIG. 29 is a diagram of a geographically distributed implementation of the features disclosed herein, according to some embodiments.

Referring now to FIG. 29, a diagram depicting a geographically distributed implementation of system 1100 is shown, according to some embodiments. In some embodiments, the components of system 1100 can be distributed across multiple locations or physical sites to allow for charging at one site and discharging at another site. As discussed above, the system 1100 can be used in a charging mode to store electricity (in the form of valence electrons of sodium atoms) and a discharging mode to produce electricity (by reactions allowing release of said valence electrons). The implementation of FIG. 29 illustrates transportation of produced sodium atoms from a first location (shown as charging site 2900) to a second location (shown at discharging site 2902), thereby also transporting the stored electricity (i.e., electricity stored as chemical energy in the produced sodium) from the first location to the second location. At the second location, a portion of system 1100 can be used to harvest the stored energy from the sodium atoms in order to output electricity. By doing so, electricity is transferred from the first location to the second location.

As one example scenario, the charging site 2900 can be located in a geographic region with high availability to green, renewable, non-polluting, non-carbon-emitting, and/or low-cost or free energy (e.g., areas with high geothermal activity, areas with high solar irradiance, areas with high winds, areas with existing energy production facilities) while the discharging site 2902 can be located at a geographic region without such energy availability (e.g., areas only having access to fossil-fuel-based energy production, areas disconnected from energy grids, etc.). Transportation of sodium from the charging site 2900 to the discharging site 2902 in such scenarios can reduce pollution (e.g., reduce carbon emissions, reduce greenhouse gases, etc.) and cost savings by allowing the discharging site 2902 to benefit from the green, renewable, non-polluting, non-carbon-emitting, and/or low-cost or free energy available at the charging site 2900.

In some embodiments, the charging site 2900 and the discharging site 2902 may be the same physical site. In this scenario, the produced sodium can be transported off-site (or to a storage location or building within the site) for storage and then returned to the site at a later time or date. For example, the sodium can be generated/stored, transported, and used to generate electricity on a seasonal basis (e.g., charging during a dry season of high solar availability and discharging during a rainy season of low solar availability, charging during low-demand seasons and discharging during high-demand seasons, etc.).

As shown in FIG. 29, the charging site 2900 receives energy from electricity source 2904. The electricity source is connected to a first instance of the stack assembly 1110 (shown as stack assembly 1110*a*) and used to provide a voltage across the stack assembly 1110*a*. Energy from the electricity source is used to drive reactions which pull sodium ions from the catholyte and add valence electrons to produce sodium atoms (e.g., as shown in FIG. 31) such that extra electrons from electricity source 2904 are stored in the sodium atoms. Sodium then flows out of the stack assembly 1110*a* to aggregator 1114, for example as illustrated in FIG. 16 with reference to the sodium production mode of the stack assembly 1110. The aggregator 1114 aggregates the sodium into a sodium storage vessel 1600 while preventing current flows between strings 1116 as described in detail above. As with the other embodiments, the aggregator 1114 could be replaced with the manifold 2600.

In the example of FIG. 29, the sodium storage vessel 1600 is positioned on (e.g., integrated with, loadable onto, etc.) a transport vehicle 2906. The transport vehicle 2906 may be a truck (or other vehicle that drives on roadways), train, ship, plane, etc. The transport vehicle 2906 is configured to move from the charging site 2900 to the discharging site 2902 while carrying the sodium in the sodium storage vessel 1600. In other embodiments, the transport vehicle 2906 is replaced with a pipeline connecting the charging site 2900 to the discharging site 2902 through which the sodium can flow. The transport vehicle 2906 and/or the sodium storage vessel 1600 may be robustly designed to prevent leaks, spills, etc. of the sodium during transportation, including in event of a crash, collision, etc. of the transport vehicle 2906. The sodium storage vessel 1600 is preferably made of a material that ensures long-term stability of the sodium.

When the transport vehicle 2906 reaches the discharging site 2902, the sodium storage vessel 1600 is connected to the distributor 1112, which serves a second instance of the stack assembly (shown as stack assembly 1110b). The distributor 1112 distributes the sodium from the sodium storage vessel 1600 to different strings of the stack assembly 1110b while preventing current flow between the strings through the sodium. As with the other embodiments, the distributor 1112 could be replaced with the manifold 2600. The stack assembly 1110b operates in a discharging mode, such that the sodium atoms give up their valence electrons and $Na^+$ ions flow into the catholyte. The released valence electrons flow out of the stack assembly as electricity provided to an electricity load 2908. The electricity load 2908 may be an energy grid, a building electrical system, a plant, a particular unit or set of equipment (e.g., manufacturing equipment), etc. in various embodiments.

FIG. 29 further illustrates that the catholyte (now enriched with $Na^+$ ions) can be provided back onto the transport vehicle 2906 (or a different transport vehicle), for example in a catholyte tank 1400. The transport vehicle 2906 then transports the catholyte to the charging site 2900, where the catholyte is provided to the stack assembly 1110a of the charging site 2900. In some embodiments, catholyte is also transported from the charging site 2900 to the discharging site 2902. This arrangement allows sodium (atoms and ions) to loop through both the charging site 2900 and the discharging site 2902 such that no or little waste (e.g., by-products, etc.) is created. Sodium-based energy transportation can thereby be provided using the geographically distributed system of FIG. 29.

Configuration of Exemplary Embodiments

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A battery cell capable of self-priming with molten metal produced within the battery cell, the battery cell comprising:
   a cathode compartment configured to contain a catholyte that releases metal ions when self-priming the battery cell;
   an anode compartment configured to receive electrons from an external power supply when self-priming the battery cell;
   an ion-selective membrane positioned between the cathode compartment and the anode compartment and configured to selectively transport the metal ions from the cathode compartment to the anode compartment when self-priming the battery cell; and
   an electrically conductive coating on a surface of the ion-selective membrane facing the anode compartment and configured to distribute the electrons received from the external power supply across the ion-selective membrane when self-priming the battery cell;
   wherein self-priming the battery cell comprises combining the electrons with the metal ions arriving at an interface between the electrically conductive coating and the ion-selective membrane to produce the molten metal within the anode compartment.

2. The battery cell of claim 1, wherein:
   the anode compartment is empty of the molten metal prior to self-priming the battery cell; and
   the molten metal produced within the anode compartment at least partially fills the anode compartment with the molten metal when self-priming the battery cell without requiring an additional supply of the molten metal from an external source.

3. The battery cell of claim 1, wherein the molten metal comprises at least one of molten sodium metal or a sodium metal alloy, the metal ions comprise sodium cations ($Na^+$), and the ion-selective membrane comprises at least one of a ceramic, NaSICON, or beta-alumina material capable of selectively transporting the sodium cations.

4. The battery cell of claim 1, comprising a power line at least partially external to the anode compartment and electrically connected to both the external power supply and the electrically conductive coating, the power line configured to provide the electrons received from the external power supply to the electrically conductive coating for distribution across the surface of the ion-selective membrane when self-priming the battery cell.

5. The battery cell of claim 4, wherein the metal ions comprise sodium cations ($Na^+$) and self-priming the battery cell comprises combining the electrons provided via the power line with the sodium cations transported through the ion-selective membrane to produce molten sodium metal within the anode compartment, the molten metal comprising the molten sodium metal.

6. The battery cell of claim 1, comprising:
   an anode current collector contained at least partially within the anode compartment;

a first power line electrically connecting the external power supply to at least one of the ion-selective membrane or the electrically conductive coating; and a second power line arranged electrically in parallel with the first power line and electrically connecting the external power supply to the anode current collector.

7. The battery cell of claim 6, wherein:

the first power line provides a first electrical connection between the external power supply and at least one of the ion-selective membrane or the electrically conductive coating when self-priming the battery cell, the first electrical connection bypassing the anode current collector;

the molten metal produced within the anode compartment provides a second electrical connection between the anode current collector and at least one of the ion-selective membrane or the electrically conductive coating after self-priming the battery cell.

8. The battery cell of claim 1, wherein the electrically conductive coating comprises at least one of a metal, a metal oxide, a metal sulfide, or carbon.

9. The battery cell of claim 1, wherein the electrically conductive coating comprises at least one of an indium tin oxide, manganese oxide, titanium oxide, nickel oxide, tungsten sulfide, nickel sulfide, titanium sulfide, zirconium sulfide, vanadium sulfide, iron sulfide, molybdenum sulfide, cobalt sulfide, or copper sulfide.

10. The battery cell of claim 1, wherein the electrically conductive coating comprises a second metal different than the molten metal, the second metal comprising at least one of tin, lead, mercury, indium, and/or any metal capable of alloying with the molten metal.

11. The battery cell of claim 1, wherein the electrically conductive coating:

forms an electrically conductive layer between the molten metal and the ion-selective membrane during initial production of the molten metal within the anode compartment; and dissolves in the molten metal produced within the anode compartment causing the molten metal to directly contact the surface of the ion-selective membrane after the electrically conductive coating dissolves.

12. The battery cell of claim 1, wherein the electrically conductive coating has a thickness substantially between 10 nanometers and 10 microns.

13. The battery cell of claim 1, wherein the electrically conductive coating has an electrical conductivity substantially between 100 Siemens/cm and $10^6$ Siemens/cm.

14. The battery cell of claim 1, wherein:

the electrons are provided to the electrically conductive coating at a single location; and the electrically conductive coating receives the electrons at the single location and distributes the electrons across the surface of the ion-selective membrane.

15. The battery cell of claim 1, comprising:

an anode current collector contained at least partially within the anode compartment and configured to receive the electrons from the external power supply; and an electron transport structure extending between the anode current collector and at least one of the ion-selective membrane or the electrically conductive coating and configured to transport the electrons from the anode current collector to at least one of the ion-selective membrane or the electrically conductive coating.

16. The battery cell of claim 15, wherein the electron transport structure comprises an electrically conductive mesh contacting at least one of the electrically conductive coating or the surface of the ion-selective membrane at a plurality of points and configured to distribute the electrons received from the anode current collector across at least one of the electrically conductive coating or the surface of the ion-selective membrane.

17. The battery cell of claim 15, wherein the electron transport structure is substantially rigid and provides structural support to the ion-selective membrane by applying a force to the surface of the ion-selective membrane.

18. The battery cell of claim 15, wherein the electron transport structure comprises one or more wires extending between the anode current collector and at least one of the electrically conductive coating or the ion-selective membrane.

19. The battery cell of claim 1, comprising a port along a surface of the anode compartment;

wherein the molten metal produced within the anode compartment flows passively between the anode compartment and an external storage container via the port without requiring a powered component to cause the molten metal to flow.

20. A method for self-priming a battery cell with molten metal produced within the battery cell, the method comprising:

releasing metal ions from a catholyte contained within a cathode compartment of the battery cell;

receiving electrons from an external power supply at an anode compartment of the battery cell;

transporting the metal ions from the cathode compartment to the anode compartment via an ion-selective membrane positioned between the cathode compartment and the anode compartment;

distributing the electrons received from the external power supply across the ion-selective membrane via an electrically conductive coating on a surface of the ion-selective membrane facing the anode compartment; and self-priming the battery cell by combining the metal ions with the electrons within the anode compartment to produce the molten metal within the anode compartment.

21. The method of claim 20, wherein:

the anode compartment is empty of the molten metal prior to self-priming the battery cell; and self-priming the battery cell comprises at least partially filling the anode compartment with the molten metal produced within the anode compartment without requiring an additional supply of the molten metal from an external source.

22. The method of claim 20, wherein:

a first portion of the metal ions released from the catholyte form a first portion of the molten metal that at least partially fills the anode compartment when self-priming the battery cell; and a second portion of the metal ions released from the catholyte form a second portion of the molten metal that flows out of the anode compartment and into an external storage container after self-priming the battery cell.

* * * * *